US007149980B1

(12) United States Patent
Nelson et al.

(10) Patent No.: US 7,149,980 B1
(45) Date of Patent: Dec. 12, 2006

(54) CONTENT VALIDATION FOR INTERACTIVE DYNAMIC DOCUMENTATION WEB SITE

(75) Inventors: Michael Wayne Nelson, Coon Rapids, MN (US); Michael De Santis, Fair Haven, NJ (US); Roberto Morales, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 09/752,402

(22) Filed: Dec. 28, 2000

(51) Int. Cl.
*G06F 3/00* (2006.01)
(52) U.S. Cl. ...................... 715/764; 715/751
(58) Field of Classification Search ........... 345/760, 345/764, 772, 810, 843, 841, 751, 733, 839; 715/530, 513, 764, 751, 760, 772, 810, 843, 715/841, 733, 839
See application file for complete search history.

(56) References Cited

U.S. PATENT DOCUMENTS

| | | | | |
|---|---|---|---|---|
| 5,706,507 A | * | 1/1998 | Schloss | 707/104.1 |
| 5,764,913 A | * | 6/1998 | Jancke et al. | 709/224 |
| 5,828,376 A | * | 10/1998 | Solimene et al. | 715/821 |
| 5,878,233 A | * | 3/1999 | Schloss | 709/225 |
| 5,911,043 A | * | 6/1999 | Duffy | 709/203 |
| 6,038,610 A | * | 3/2000 | Belfiore et al. | 709/310 |
| 6,233,600 B1 | * | 5/2001 | Salas et al. | 709/201 |
| 6,295,559 B1 | * | 9/2001 | Emens | 709/225 |
| 6,401,041 B1 | * | 6/2002 | Petersen | 702/5 |
| 6,405,226 B1 | * | 6/2002 | Alpert et al. | 715/530 |

FOREIGN PATENT DOCUMENTS

WO  WO 00/52590 A1 *  9/2000

OTHER PUBLICATIONS

Net Nanny Software International Inc, Sep. 12, 2000, pp. 1-2.*

* cited by examiner

*Primary Examiner*—Kieu D. Vu

(57) ABSTRACT

A method and apparatus for providing validation to content, e.g., technical information and displaying that validation to a user. In one embodiment, the present invention is comprised of a content validator. The content validator is configured as a validating traffic light adapted to depict the state of the validity of the content. The validating traffic light is comprised of a plurality of different colors that are illuminated to depict the states of the validity of the content. The content validator is adapted to be responsive to received user submissions. User submissions may be comprised of new content, comments on existing content, corrections of content, and/or validation of content. User submissions may further be comprised of validation of new content, validation of comments on content, and/or validation of corrections of content. The content validator further provides for those received submissions to be included in the indicated validity of the content.

44 Claims, 28 Drawing Sheets

How Do I: New Content - Netscape

Question: Changin:

**Contributor*:** mwnelson

Description: (a more detailed version of the question - optional)

To change SNMP manager in SC2200 2.0 without using TCT, change current entries in /opt/TransPath/snmp/snmpd.cnf. Changing the entries in

Answer:

If using TCT:
1) On TCT
- delete the old SNMP manager and add a new one with the new IP address.
- build and deploy the config
2) On the MASTER stop transpath (we don't want frepld overwriting stuff we've just changed).
3) On the SLAVE : use "config-lib retrieve" to get the new config. You

[ Cancel ]   [ Reset ]   [ Submit ]

* Only the original contributor (mwnelson) and the administrator may edit this entry once it is submitted. If you are submitting content on behalf of someone else place their user id in this field.

file: /cgi-shell/odd/howDoI/editContent.pl          modifed: October 18, 2000

How Do I: Correction - Netscape

Question: Changing the SNMP manager with and without TCT

2 — contributor*: xuchen        current validation level: [ 0 ]

Description:       (a more detailed version of the question - optional)

To change SNMP manager in SC2200 2.0 without using TCT, change current entries in /opt/TransPath/snmp/snmpd.cnf. Changing the entries in 3 — Answer:

If using TCT:
1) On TCT
- delete the old SNMP manager and add a new one with the new IP address.
- build and deploy the config
2150 → 2) On the SLAVE : stop transpath (we don't want frepld overwriting stuff we've just changed).
3) On the SLAVE : use "config-lib retrieve" to get the new config. You

[ Cancel ]  [ Delete ]  [ Reset ]  [ Submit ]

* Only the original contributor(mwnelson) and the administrator may edit this entry once it is submitted. If you are submitting content on behalf of someone else place their user id in this field.

file: /cgi-shell/odd/howDoI/editContent.pl        modified: October 18, 2000

How Do I: Comments - Netscape

Disable sync on two VSC's in order to make changes on one box.

Description:
Disable sync on two VSC's (active and backup configurations) in order to make changes on one box. The objective is to allow you to roll back to the working configuration in the event the new configuration has problems and minimize impact to production. This might be used for example, with customers when timers are changed, trunks are added, or additional destinations are added.

Answer:
1. Make sure FOVERD (the fail over daemon) is running on the standby VSC using the UNIX command:
ps -ef |grep trans
2. Ensure the current configurations are synced up with each other.
3. Stop the engine on the Active system and ensure the standby VSC has assumed control.
4. Change "*.desiredPlatformState" in XECfgparm.dat on both VSC to "standalone"
5. Change "*.SyschedpointEnabled" in XECfgparm.dat on active VSC to "false"
6. Make the desired change on the active VSC and then switch back to the active VSC, using step 1 and 3 in reverse.
7. If the configurations are correct everything should work as desired.
8. Change "*.SyschedpointEnabled" in XECfgparm.dat on the active VSC to "true"

Current Validation Level: 0

Comments:

```
new comment goes here
``` comment id: [auto-generated]         contributed by mwnelson

Cancel   Reset   Submit file: /cgi-shell/odd/howDoI/editContent.pl         modified: October 18, 2000

Disable sync on two VSC's in order to make changes on one box.

Description:
Disable sync on two VSC's (active and backup configurations) in order to make changes on one box. The objective is to allow you to roll back to the working configuration in the event the new configuration has problems and minimize impact to production. This might be used for example, with customers when timers are changed, trunks are added, or additional destinations are added.

Answer:
1. Make sure FOVERD (the fail over daemon) is running on the standby VSC using the UNIX command:
ps -ef |grep trans
2. Ensure the current configurations are synced up with each other.
3. Stop the engine on the Active system and ensure the standby VSC has assumed control.
4. Change "".desiredPlatformState" in XECfgparm.dat on both VSC to "standalone"
5. Change "".SyschedpointEnabled" in XECfgparm.dat on active VSC to "false"
6. Make the desired change on the active VSC and then switch back to the active VSC, using step 1 and 3 in reverse.
7. If the configurations are correct everything should work as desired.
8. Change "".SyschedpointEnabled" in XECfgparm.dat on the active VSC to "true"

Comments:

1 — Can someone please validate this procedure? I have seen other recommendations in the past that differ with this one and I would like to know this information is correct.
submitted 11/09/2000 at 14:50       comment id: 33

2 — I have used this procedure and have validated it. The light should now be green!!
submitted 11/09/2000 at 14:52       comment id: 34

Cancel modified: September 25, 2000

FIGURE 24

CONTENT VALIDATION FOR INTERACTIVE DYNAMIC DOCUMENTATION WEB SITE

FIELD OF THE INVENTION

The present invention relates to a system and method for providing content validation in a web site environment. More particularly, the present invention provides content validation for online interactive dynamic documentation.

BACKGROUND OF THE INVENTION

When an individual, or groups or teams of individuals, utilize the Internet to search for and to access a web site that contains specific information/data, e.g., some type of technical information that is pertinent to that individual's search, the information/data that is returned to those individuals, via a graphical display, has been previously compiled. This means that the information/data that is presented to the individual is only as current as the last update. It is, unfortunately, commonplace for the most recent update to have taken place weeks, months, or, in some instances, years earlier.

The information/data, e.g., technical information regarding a company's product, that is available to the individual, or groups thereof, is the result of a rather laborious process of acquiring the necessary information, categorizing the information into related sections, compiling that information into a, hopefully, well organized format, which will then allow an individual to obtain the information/data that is pertinent to their specific needs.

The acquisition, categorization, compilation, presentation, and the subsequent mandatory maintenance of that technical information is an extremely expensive, time consuming and laborious task. Current methods used for knowledge acquisition and subsequent propagation to its audience are time consuming, very inefficient and expensive. Access to the experts, e.g., development engineers, software developers, field engineers, etc., who supply the source information is difficult at best due to their busy schedules. As such, they have a minimal amount of time to contribute to and/or to review the technical information to be documented, much less spending time explaining things to those who are directly involved in the writing and creating of the technical guide. In addition, pulling them away from their primary tasks could be directly associated with added costs of product development as well as impacting the projected delivery date of their company's products. However, their collaboration, with regard to the technical information, is clearly required throughout all phases of deployment of, e.g., that company's product/solution.

Additionally, it is also important to obtain the information to be utilized from a wide array of organizations and perspectives such as technical assistance centers, field organizations, and professional services. It would be especially advantageous to have a more comprehensive knowledge base from which to draw the information, therefore providing to an individual a more complete reference material.

Furthermore, dissemination/distribution of the technical information/data is critical to the success of a company's product line as the production/solution must be supportable throughout all phases of deployment of that product.

Currently, common viable means of gathering this information from the engineers, developers, and other experts include, in one example, the acquisition of the information through countless e-mails, which is accompanied by the usual wait time for a response. Another method of gathering the information can be through conference calls between the involved contributors, provided, of course, that each contributor has the time available. As is well known, scheduling conflicts among engineers and developers are not uncommon, which can postpone the conference calls for days, weeks, or even months, which could delay the release of the company's products. Additionally, another means of gathering the information involves the off-site meeting, which, by virtue of the travel required, is even more difficult to schedule than a conference call.

All of these factors contribute to unnecessarily incurred expenses in either the time spent tracking down the information, or in time spent completing the information when acquired in a fragmented form, or in the time and effort spent determining if there was a duplication of the information obtained. Other factors that may contribute to the higher costs of production and/or deployment of a company's product/solution may include the determination of whether the information obtained is marginal, with regard to the appropriateness of the content, and determining the validity of the information obtained, with regard to the correctness of information, such as applied to technical information.

Thus, a need exists for a method of receiving user submitted information that not only has continuous, simultaneous and omnipresent availability to all potential information providers, but also is capable of storing and categorizing that information as it is received. A further need exists for providing feedback to the user who submitted the information. Additionally, a need exists for a method to make this information available to all potential users of the information as soon as it is received.

Thus a further need exists for a method to validate information, e.g., technical information, that is presented in a web page environment. Additionally, a need exists for a visible display that represents the validity of the information. Further, an additional need exists for providing a method to comment on the information, so that the comment may influence the displayed validity of the information. Another need exists to provide a method to correct the information, such that those corrections will affect the displayed validity of the information. A further need exists for providing a method for submitting new information. An additional need exists for providing a method for submitting additional information to existing information.

SUMMARY OF THE INVENTION

Accordingly, the present invention provides a method and apparatus for collecting, organizing, presenting, and providing validation to content, e.g., technical information, available in a network environment, such that the validation is displayed to a user. In one embodiment, the present invention is comprised of a content validator. The content validator is comprised of a validating traffic light adapted to depict the state of the validity of the content. The validating traffic light is comprised of a plurality of different colors that are illuminated to depict the various states of the validity of the content. The content validator is adapted to be responsive to received user submissions. User submissions may be comprised of new content, comments on existing content, corrections of content, and/or validation of content. User submissions may further be comprised of validation of new content, validation of comments on content, and/or validation of corrections of content. The content validator further provides for those received submissions to be included in the indicated validity of the content.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 8 is a computer generated screen shot depicting one web page of the present invention, in accordance with one embodiment of the present invention.

FIG. 11 is a computer generated screen shot sequentially depicting the web page of FIG. 10, in accordance with one embodiment of the present invention.

FIG. 18 is a computer generated screen shot of a web page in a sequential continuation of the computer generated screen shot depicting the web page of FIG. 17, in accordance with one embodiment of the present invention.

FIG. 19 is a computer generated screen shot sequentially depicting the web page of FIG. 18, in accordance with one embodiment of the present invention.

FIG. 21 is a computer generated screen shot of a web page in a sequential continuation of the computer generated screen shot depicting the web page of FIGS. 13 and 20, in accordance with one embodiment of the present invention.

FIG. 23 is a computer generated screen shot of a web page in a sequential continuation of the computer generated screen shot depicting the web pages of FIGS. 13, 20, and 22, in accordance with one embodiment of the present invention.

FIG. 24 is a computer generated screen shot sequentially depicting the web page of FIG. 23, in accordance with one embodiment of the present invention.

DETAILED DESCRIPTION

Figure 1:
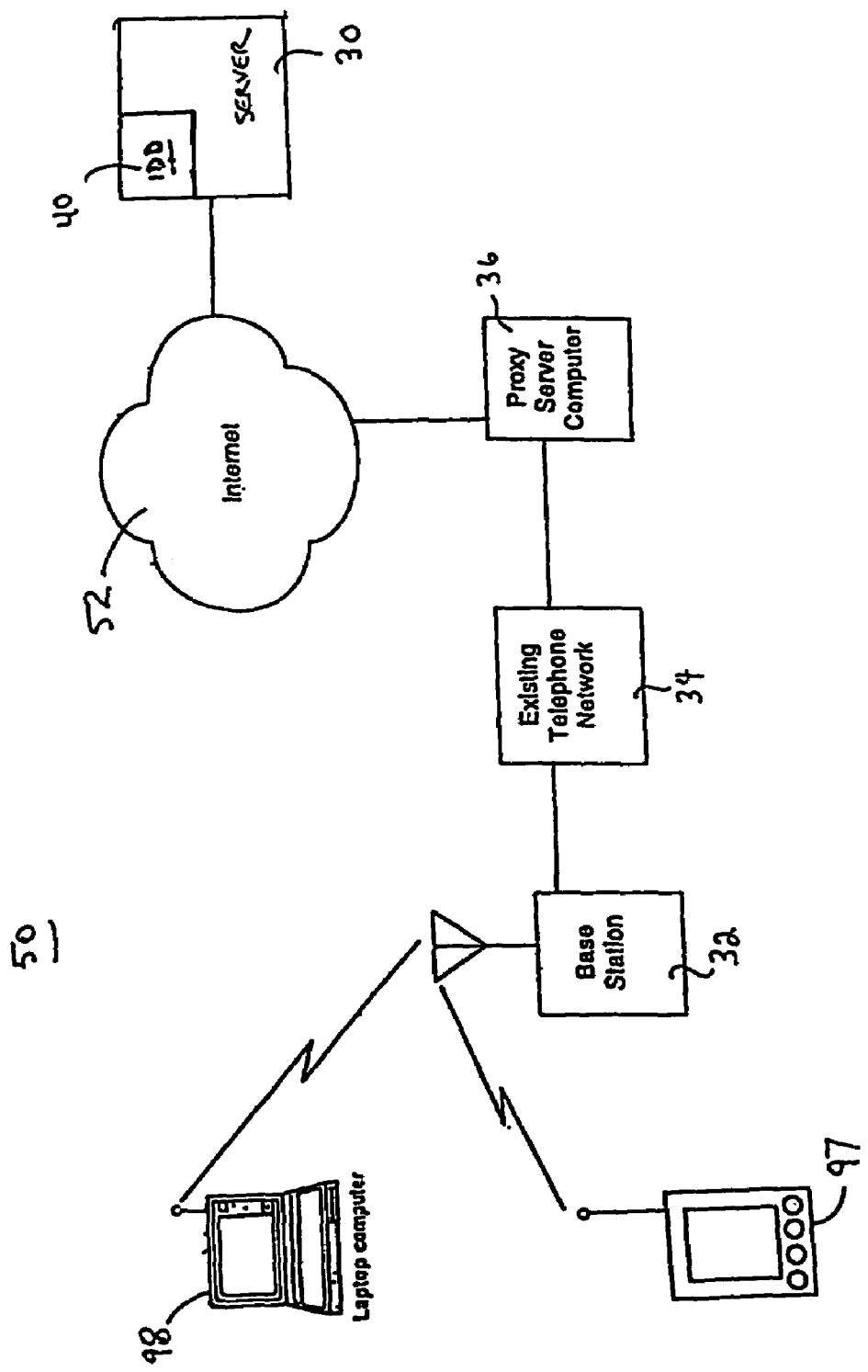
FIG. 1 is a block diagram of an exemplary network environment including a portable computer system and a laptop computer system, in accordance with one embodiment of the present invention.

A method and apparatus for receiving and displaying validation to content, e.g., technical information in a network environment is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "clicking on" or "selecting" or "choosing" or "entering" or "indicating" or "submitting" or "receiving" or "performing" or "initiating" or "sending" or "implementing" or "disabling" or "enabling" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention, a method and apparatus for validating content, is discussed primarily in the context of web based information available online. In one example of one embodiment of the present invention, the information is of a technical nature. However, it is appreciated that the present invention can implemented for utilization by most types of information. It should further be appreciated that the present invention can be utilized by most types of devices that have the capability to access some type of central device or central site.

For purposes of the present application, the term "handheld computer system" is not limited solely to conventional handheld or palmtop computers. Instead, the term "handheld computer" or "handheld computer system" or "palmtop computer system" is also intended to include any mobile device which can be used to communicate with a network. Such mobile devices include but are not limited to pagers and paging systems, wireless and cellular telephones, electronic address books, and numerous other mobile devices which have the ability to communicate with a network or other computers, either through a wired or wireless connection. As such, for purposes of the present application, the terms "handheld computer" and "palmtop device" and "palmtop computer system" will be considered synonymous and will be used interchangeably throughout the present application.

For purposes of the present application, the term "laptop computer" or laptop computer system" is intended to include any easily transportable computer system that is not classified as a "palmtop computer, or handheld computer, or handheld computer system." Furthermore, the "laptop computer" is configured such that it has the ability to communicate with a network or other computer systems, either through a wired connection e.g., a modem or NIC (network interface card) and the like, or through a wireless connection.

For purposes of the present application, the term "desktop computer" or "desktop computer system" is intended to include those computer systems that are not easily transportable, e.g., a desktop computer system or a computer workstation and the like. Furthermore, the "desktop computer" is configured such that it has the ability to communicate with a network or other computers, either through a wired connection e.g., a modem or a NIC (network interface card) and the like, or through a wireless connection.

FIG. 1 is a block diagram of an exemplary network environment 50 including a portable computer system 97, a laptop computer system 98 and server 30, in which is located IDD (interactive dynamic documentation web site) 40, one embodiment of the present invention. Base station 32 can be both a transmitter and receiver base station, which can be implemented by coupling it into an existing public telephone network 34. Implemented in this manner, base station 32 enables portable computer system 97 and/or laptop computer system 98 to communicate with a proxy server computer system 36, which is coupled by wire to the existing public telephone network 34. Furthermore, proxy server computer system 36 is coupled to the Internet 52, thereby enabling portable computer system 97 and/or laptop computer system 98 to communicate with the Internet 52 thereby enabling access to IDD (interactive dynamic documentation web site) 40 located within server 30. When communicating with a web site over Internet 52, protocols such as CTP (Compact Transport Protocol) and CML (Compact Markup Language) and protocols such as HTTP (Hypertext Transfer Protocol) and HTML (Hypertext Markup Language) can be utilized by portable computer system 97, laptop computer 98, and/or desktop computer system 99 of FIG. 2, in the present embodiment.

It should be appreciated that one of the functions of proxy server 36 is to perform operations over the Internet 52 on behalf of portable computer system 97 and/or laptop computer 98. For example, proxy server 36 has a particular Internet address and acts as a proxy device for portable computer system 97 and/or laptop computer system 98 over the Internet 52.

It should be further appreciated that other embodiments of a communications network, planned or envisioned, may be utilized in accordance with the present invention. For example, a wireless connection may be made from portable computer system 97 and/or laptop computer system 98 directly to the Internet 52 to access IDD (interactive dynamic documentation web site) 40 located within server 30.

The data and information, communicated between base station 32 and portable computer system 97 and/or laptop computer system 98, are the same type of information and data that can conventionally be transferred and received over a public telephone wire network system. Additionally, in FIG. 1, the existing telephone network could also be a packet-based network, as is utilized by some computer systems. However, a wireless communication interface is utilized to communicate data and information between portable computer system 97 and/or laptop computer system 98 and base station 32. Furthermore, any wireless network can support the functionality to be disclosed herein.

Figure 2:
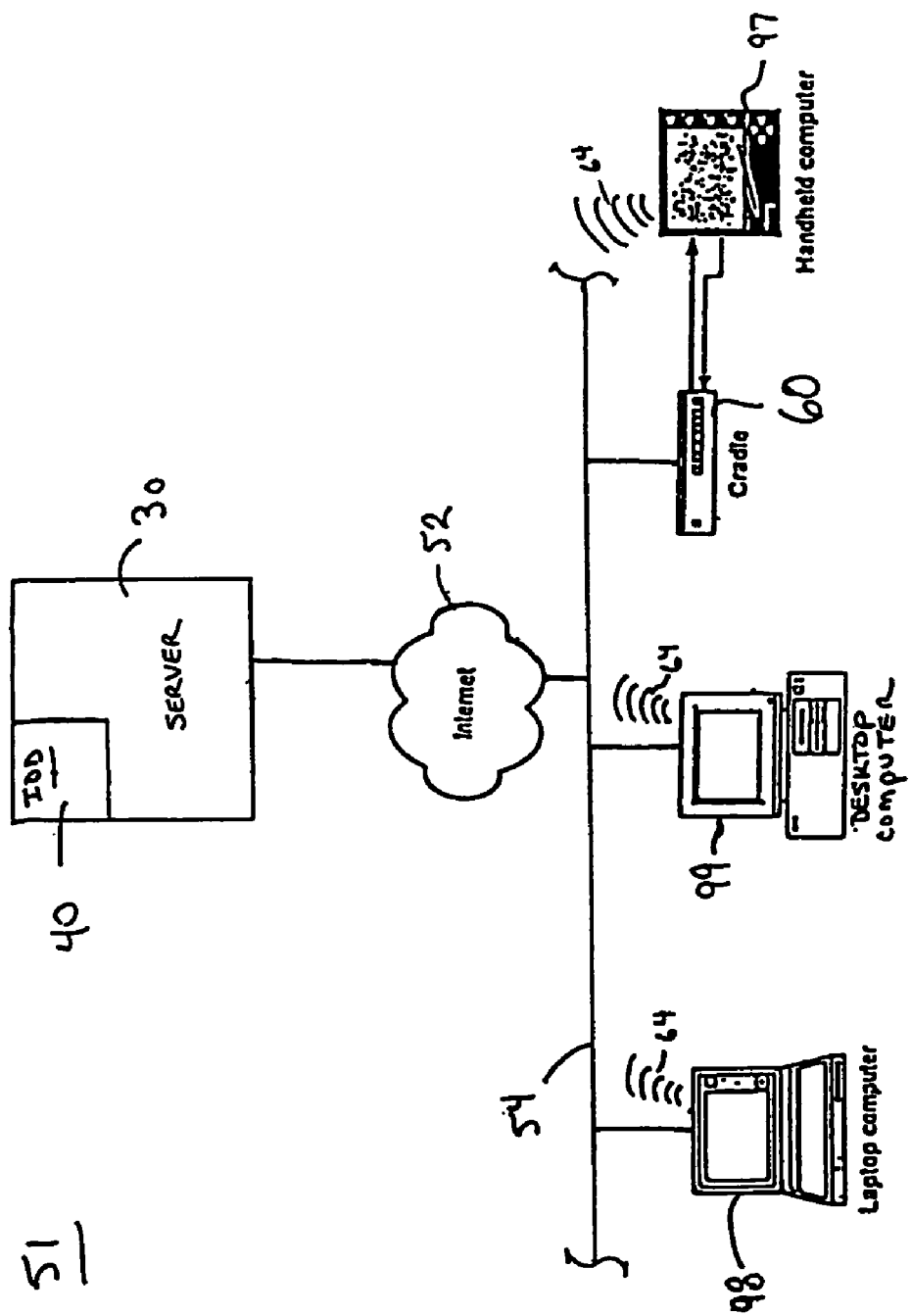
FIG. 2 is a block diagram of an exemplary network environment including a portable computer system, a laptop computer system, and a desktop computer system, in accordance with one embodiment of the present invention.

FIG. 2 illustrates another embodiment of a system 51 that can be used in conjunction with various embodiments of the present invention. System 51 is shown as comprising a desktop computer system 99, a laptop system 98, a handheld computer system 97, Internet 52, and server 30, in which is located IDD (interactive dynamic documentation web site) 40. Optionally, one or more desktop, laptop, and/or handheld computer systems can be used within system 51. Desktop computer system 99 and laptop computer 98 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52, using a number of well-known protocols, to provide access to IDD (interactive dynamic documentation web site) 40 located within server 30.

Importantly, bus 54 is also coupled to a cradle 60 for receiving and initiating communication with handheld computer system 97. Cradle 60 provides an electrical and mechanical communication interface between bus 54 (and anything coupled to bus 54) and handheld computer system 97 for two-way communications. Handheld computer system 97 may instead be coupled to desktop computer system 99 and/or laptop computer system 98 via a wireless (radio) connection. Handheld computer system 97, laptop computer system 98, and/or desktop computer system 99 may also contain a wireless infrared communication mechanism 64 for sending and receiving information from other devices.

With reference to both FIGS. 1 and 2, it is appreciated that handheld computer system 97, laptop computer system 98, and/or desktop computer system 99, can be used in a network environment combining elements of networks 50 and 51. That is, handheld computer system 97, laptop computer system 98, and/or desktop computer system 99, can include both a wireless infrared communication mechanism and a signal (e.g., radio) receiver/transmitter device.

It should also be appreciated that, in one embodiment of the present invention wherein server 30 is disposed internal of a intranet network configuration (located within the firewall of an organization or corporation), Internet 52 is not required for access to IDD (interactive dynamic documentation web site) 40 located within server 30. Desktop computer system 99, laptop computer system 98, and/or handheld computer system 97 may be communicatively coupled to server 30 and IDD 40, through bus 54 which may be configured as a network communication line, e.g., a local area network (LAN), a wide area network (WAN), a metropolitan area network (MAN), or most other network configurations that enable communication between computers.

The mechanisms for communicatively coupling computer systems over the Internet or over Intranets are well-known in the art. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). IDD (interactive dynamic documentation web site) 40, located within server 30, may be accessed through a series of connected hubs, routers, bridges, and switches, configured to provide access to server 30 which contains IDD (interactive dynamic documentation web site) 40. It should be further appreciated that other embodiments of a communications network, planned or envisioned, may be utilized in accordance with the present invention.

Figure 3:
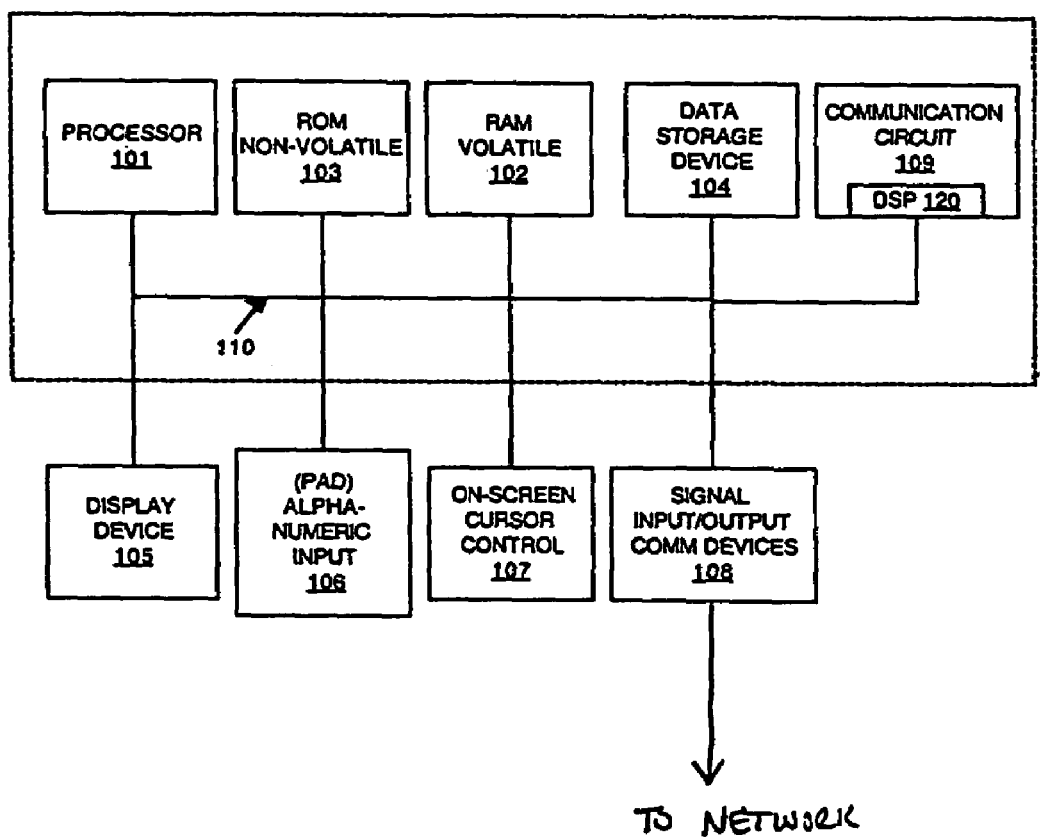
FIG. 3 is a block diagram depicting an exemplary computer system, in accordance with one embodiment of the present invention.

FIG. 3 is a logical block diagram that illustrates circuitry of an exemplary computer system 100, which can be implemented within handheld computer system 97, laptop computer system 98, desktop computer system 99, and/or server 30 upon which embodiments of the present invention may be practiced. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes a data storage device 104 coupled with the bus 110 for storing information and instructions. Data storage device 104 can be, for example, an HDD (hard disk drive), an FDD (floppy disk drive), a memory stick, a CD-RW (compact disk with write functionality), a tape drive, etc., and furthermore device 104 can be in multiples or in a combination thereof. Data storage device 104 may also be removable or hot swappable (connected or unconnected while computer is powered).

With reference still to FIG. 3, computer system 100 also includes a signal transmitter/receiver device 108, which is coupled to bus 110 for providing a physical communication link between computer system 100, and a network environment (e.g., network environments 50 and 51 of FIGS. 1 and 2, respectively). As such, signal transmitter/receiver device 108 enables central processor unit 101 to communicate with other electronic systems coupled to the network. It should be appreciated that the present embodiment of signal transmitter/receiver device 108 is well suited to be implemented in a wide variety of ways. In one example, signal transmitter/receiver device 108 is coupled to an antenna and provides the functionality to transmit and receive information over a wireless communication interface. In another example, signal transmitter/receiver device 108 could be implemented as a modem. In yet another example, device 108 could be configured as a NIC (network interface card).

In FIG. 3, in one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 3 is an optional alphanumeric input device 106. In one implementation, e.g., when utilized in handheld computer system 97, device 106 is a handwriting recognition pad ("digitizer"). In another implementation, e.g., when utilized in either laptop computer system 98 and/or desktop computer system 99, device 106 is a keyboard. Alphanumeric input device 106 can communicate information and command selections to processor 101.

Computer system 100 of FIG. 3 also includes an optional cursor control or directing device (on-screen cursor control 107) coupled to bus 110 for communicating user input information and command selections to processor 101. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

In one implementation, e.g., when utilized in handheld computer system 97, on-screen cursor control device 107 may be a touch screen device incorporated with display device 105. On-screen cursor control device 107 is capable of registering a position on display device 105 where the stylus makes contact. In another implementation, e.g., when utilized in laptop computer system 98, on-screen cursor control device 107 may be a touch pad, or, in another implementation, a finger activated push stick. In another implementation, e.g., when utilized in desktop computer system 99, on-screen cursor control device 107 may be a mouse or similar pointing device.

As described above, computer system 100 also contains a display device 105 coupled to the bus 110 for displaying information to the computer user. Display device 105 is suitable for generating graphic images and alphanumeric characters recognizable to the user. Any of a number of display technologies can be used, e.g., cathode ray tube (CRT), liquid crystal display (LCD), field emission display (FED), thin film transistor (TFT), plasma, etc., for display device 105.

Figure 4:
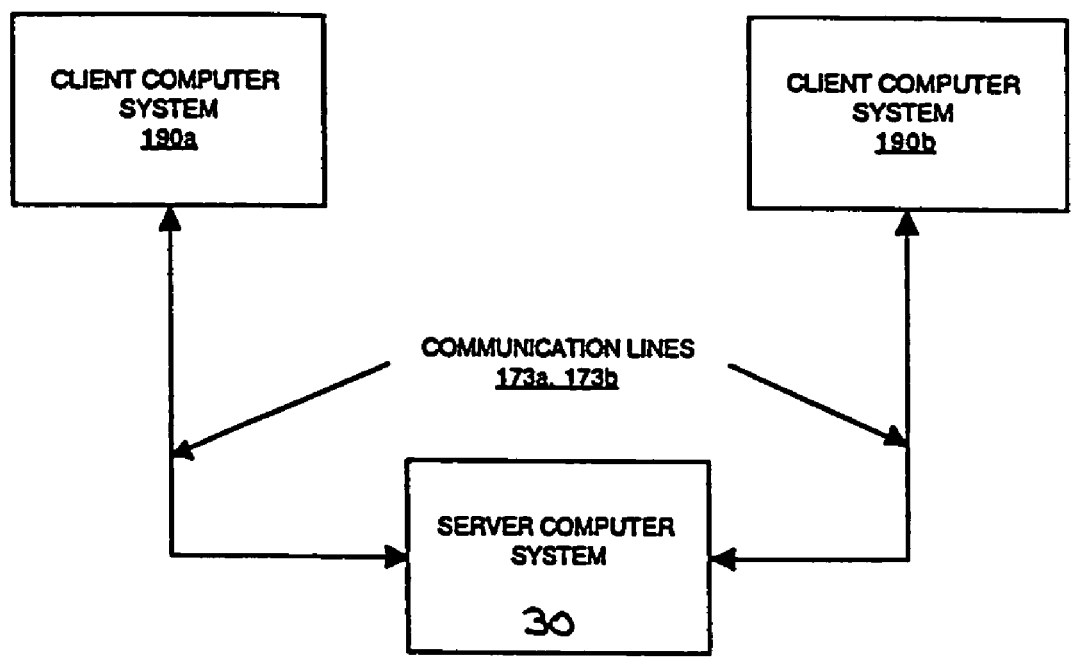
FIG. 4 is a block diagram depicting an exemplary client/server environment, in accordance with one embodiment of the present invention.

FIG. 4 is a block diagram illustrating an exemplary client-server computer system network 170 upon which embodiments of the present invention may be practiced. Network 170 may be a communication network located within a firewall of an organization or corporation (an "Intranet"), or network 170 may represent a portion of the World wide Web or Internet. Client (or user) computer systems 190a and 190b and server computer system 30, wherein IDD (interactive dynamic documentation web site) 40 is disposed, are communicatively coupled via communication lines 173a and 173b; the mechanisms for communicatively coupling computer systems over the Internet or over Intranets are well-known in the art. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 190a and 190b can be coupled to server computer 30 via an input/output port (e.g., a serial port) of server computer system 30, that is, client computer systems 190a and 190b and server computer system 30 may be non-networked devices. Though network 170 of FIG. 4 is shown to include one server computer system 30, it is appreciated that more than one server computer system 30 can be used.

In general, the layout language for a Web document is Hypertext Markup Language (HTML). Web documents are stored in HTML format in association with "server" software on remote servers. A Web document is given a "Uniform Resource Locator" (URL) which is essentially an address path identifying the server which hosts the desired document plus the location of the document on the server. Using "browser" software, an end-user can send a request from a client computer to access a document stored at a particular URL. Browser software such as Netscape™ Navigator, of Netscape Communications Corporation of Mountain View, Calif., is well known and widely available. When the server receives the user's request, it sends the requested HTML Web document to the client where the document can be displayed. The communication protocol used in making such a request and in transferring Web documents is "Hypertext Transfer Protocol" (HTTP).

Description of the Interactive Dynamic Documentation Web Site

It should be noted that in the context of the present invention, the term "solution" is meant to represent one or more products being used in conjunction with each other to achieve a common goal, such as e.g., Thunder Dial, which might include a router, a signal controller, and a signaling link terminal. It should be further noted that the term "product" is meant to represent a single component of that solution, such as the signaling controller.

It should be further appreciated that in the context of the disclosure, the term user is considered an authorized user, such that the authorized user has been granted access to IDD 40. The user is subject to administrative permission levels, such that authorized users have various levels of access, dependent upon the authorized user's classification.

Figure 5:
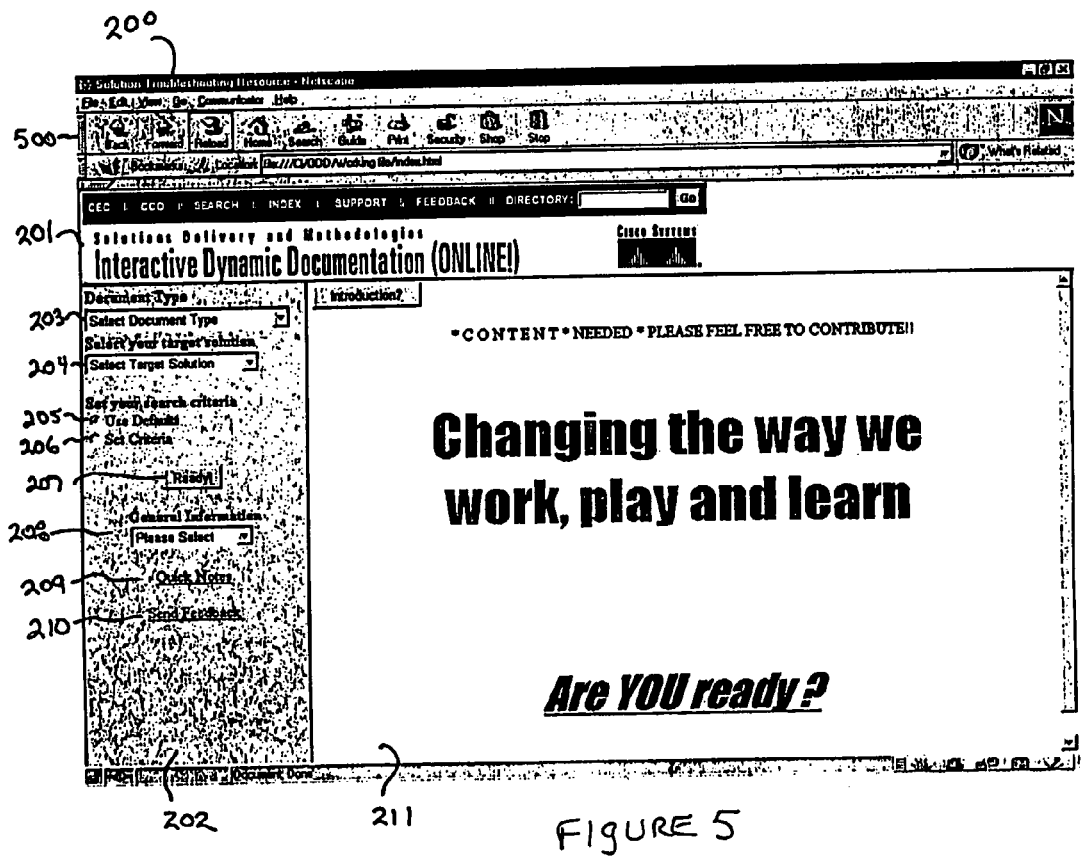
FIG. 5 is a computer generated screen shot depicting one web page of the present invention, in accordance with one embodiment of the present invention.

Referring to FIG. 5, index/home page 200 of IDD (interactive dynamic documentation web site) 40 is shown. Index page 200 is the default opening page that is displayed when an individual first initiates access to IDD (interactive dynamic documentation web site) 40, in one embodiment of the present invention. It is through index page 200 that all subsequent pages are accessible. Title bar 201 is shown as disposed directly below Netscape™ browser menu bar 500. It should be appreciated that while IDD (interactive dynamic documentation web site) 40 is, in one embodiment of the present invention, depicted and described utilizing the Netscape™ browser, this should not be construed as a limitation as to the type of Internet browser that can be utilized. In fact, nearly any Internet browser may be utilized to access IDD 40.

Still with reference to FIG. 5, beneath title bar 201 are two defined regions. On the left is defined region 202 and on the right is defined region 211. Region 202 is comprised of, from top to bottom, PDM (pull down menu) 203, PDM (pull down menu) 204, radio buttons 205 and 206, ready button 207, (pull down menu) 208, and link 209 and link 210.

Further, regarding FIG. 5, in each instancing of the PDM (pull down menu), a different category is listed. PDM (pull down menu) 203, in this example of one embodiment of the present invention, is disposed near the top of region 202. In this embodiment of the present invention, PDM 203 contains selections pertaining to available document types such as e.g., site survey, solution design guide, and others. PDM (pull down menu) 204, located directly below PDM 203 contains selections regarding a variety of target solutions/products, in one embodiment of the present invention. As previously recited, a solution is a term for a group of interrelated products that, in combination, fulfill the customers particular needs. By specifying the target solution/product, this will drive all subsequent queries and data retrieval. To access the information contained within IDD (interactive dynamic documentation web site) 40, an individual selects from the pull down menus disposed within region 202, which provide the assorted subject matter from which to choose.

Still referring to FIG. 5, disposed beneath PDM (pull down menu) 204 are default radio button 205, set criteria radio button 206, and ready button 207. Default radio button 205 is disposed above set criteria radio button 206 and set criteria radio button 206 is disposed above ready button 207, in one embodiment of the present invention. Default radio button 205 is adapted to be utilized when a user desires to obtain all the available information regarding a specific solution or product, in this embodiment of the present invention. Set criteria radio button 206 is adapted to be utilized when a user desires to further define and narrow the scope of the available information they are obtaining regarding a particular solution or product, in this embodiment of the present invention. After a user selects the target solution/product, and the default or the set criteria button, that user clicks on ready button 207, which triggers the retrieval of the data relevant to the solution previously chosen.

Figure 8:
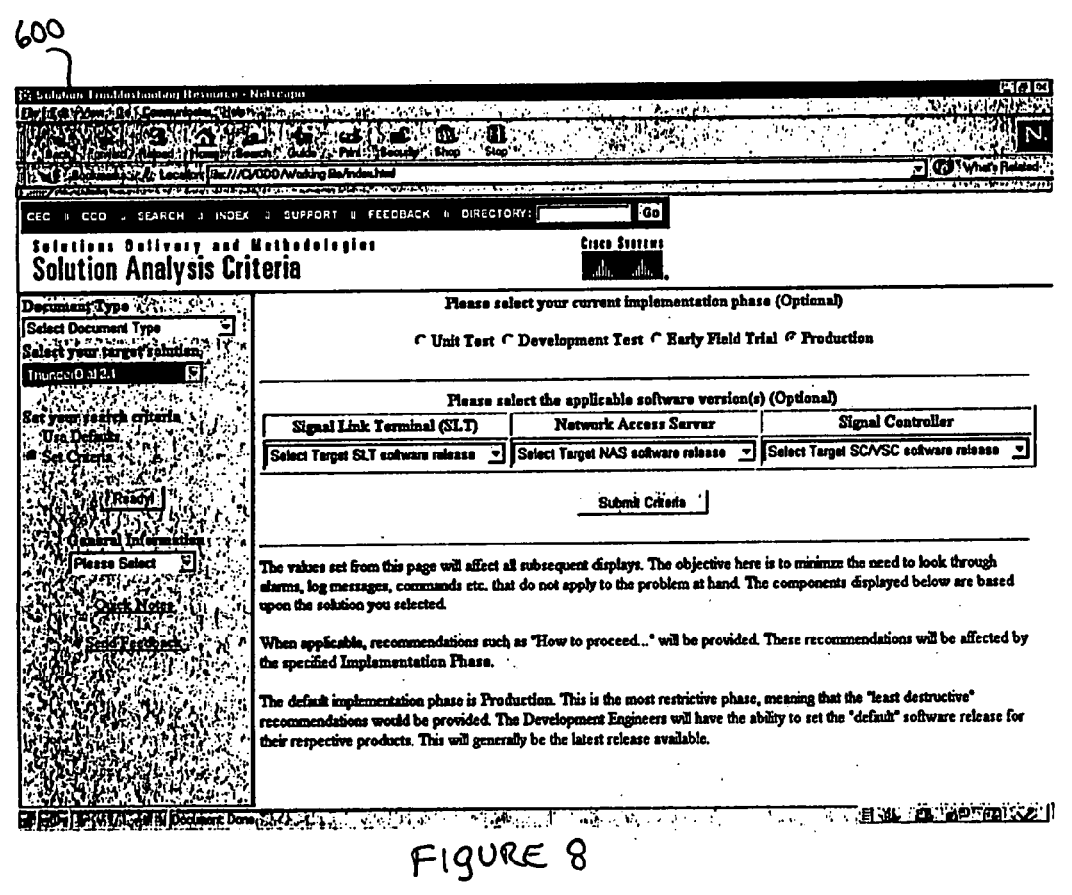
Figure 16:
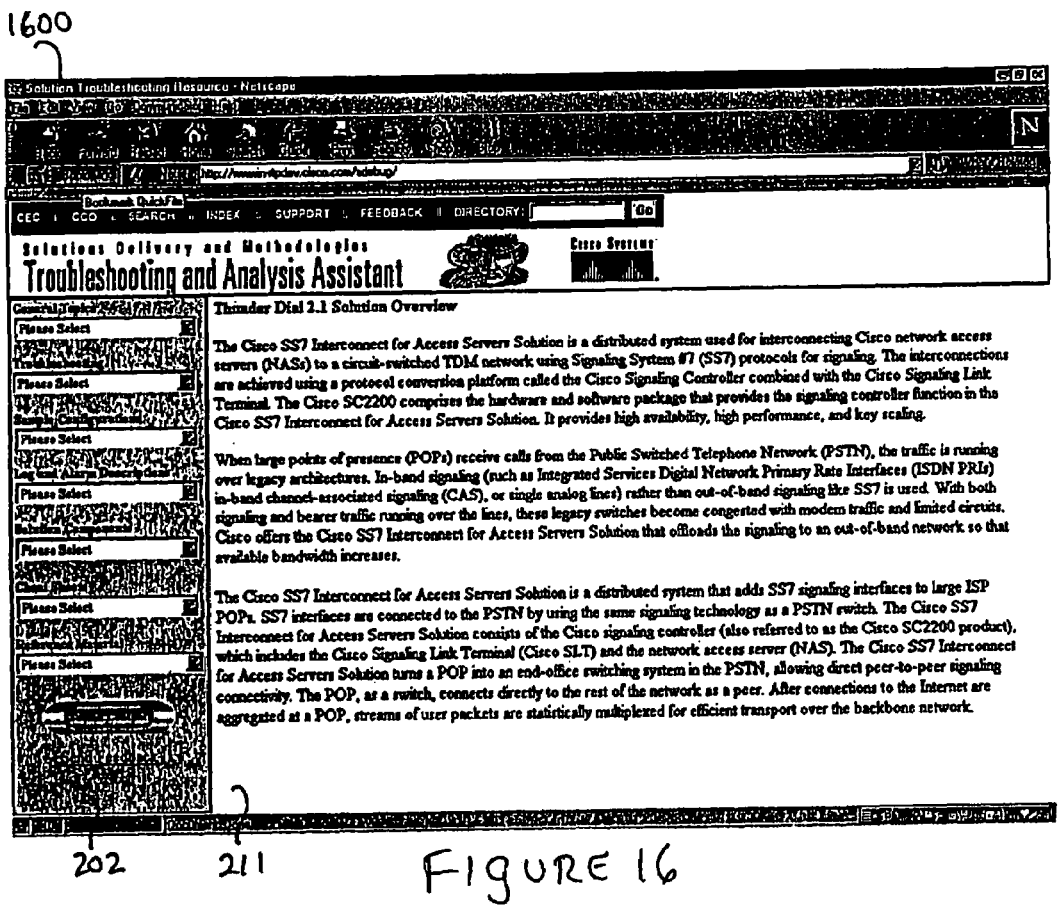
FIG. 16 is a computer generated screen shot sequentially depicting the web page of FIG. 15, in accordance with one embodiment of the present invention.

In one embodiment of the present invention, when the user selects set criteria button 206, and clicks on ready button 207, additional pull down menus, such as those shown disposed within region 211 of FIG. 8, are presented to the user to assist in further specifying the information to be retrieved. In another embodiment of the present invention, when the user selects default button 205, and then clicks on ready button 207, an entire new web page is presented to the user, such as the web page depicted in FIG. 16. As shown in FIG. 16, in this example of one embodiment of the present invention, multiple pull down menus, different from the pull down menus from FIG. 5, are disposed within region 202 and a general solution overview is disposed within region 211.

It should be appreciated that many of the web pages that comprise IDD (interactive dynamic documentation web site) 40 have functions and different physical layouts that are dependent upon the user's purpose and/or the type of information or data with which the user desires to interact. In one embodiment, there may be two or three pull down menus disposed within region 202, as depicted in FIG. 5. In another embodiment, there may be more than six pull down menus within that same region, as depicted in FIG. 16. In another embodiment, there may not even be a region 202 or region 211 presented to the user, as depicted in, e.g., FIGS. 20, 21, and 22. In fact, there is an almost unlimited number of web page configurations, layouts, and associated components (pull down menus, buttons, links, etc.) that can comprise the IDD web site.

It should also be appreciated that while, in one embodiment of the present invention, HTML (hypertext markup language), a well known mark-up language, was utilized to create the web pages that comprise the IDD web site, other mark-up languages that possess the capability of creating web pages, such as, e.g., XML (extensible markup language), SGML (standard generalized markup language) of which HTML is a subset, and/or CML (compact markup language) may be utilized.

It should further be appreciated that the IDD (interactive dynamic documentation web site) 40, in one embodiment of the present invention, is additionally comprised of an auto email notification feature. In one embodiment, the auto email notification is utilized in feedback of content that was submitted by authors or providers (development engineers). IDD 40 provides extensive benefits to its user group by opening up the entire content collection activity to a wider audience (information depth and breadth) and by promoting the immediacy of information (validation). Furthermore, it ensures that content is accurate and as current as possible. Additionally, IDD 40 provides critical benefits to the document authors and content providers (development engineers).

In one example, development engineers write software with a variety of log messages and alarms. Their understanding of the code and the reason for adding a log message or alarm may be intuitive from their perspective. However, users of their software will not have the same depth of understanding. Therefore, the logs and alarms are likely to lack comprehensive descriptions that meets the users needs. The user(s) can provide this feedback to the developer, simply by adding a comment to the particular log or alarm message. In another example, this auto email notification may involve a specific command set. The original author of the article or document section may have a limited understanding of the type of information the user(s) need and will themselves benefit from the feedback gained from a user placing a comment on the item.

In one embodiment of the present invention, IDD (interactive dynamic documentation web site) 40 universally applies the concept of auto email notification so that adding new content, correcting content, validating content, commenting on content, and document building can all generate email notifications to a subset of associated users. IDD 40 provides interfaces so that users can be added as recipients of these notifications based on need. Those interfaces also enable a user to designate whether or not they wish to receive the auto email notifications. In one example of one embodiment of the present invention, a user may want to be notified when new log messages are added but not want to be notified when a new technical tip is added. A development engineer may want to notified when a comment is placed against one of his alarm messages but not when a comment is placed against one of the alarm messages that a co-developer had written, and so forth.

It should be further appreciated that administrators or technical leads are enabled to customize the auto email notifications. User IDs can be added and/or deleted per topic, per comment, per validation, per correction, as well as by document type and by selected content of a document type. The resulting lists can also be viewed as a reference to who else is receiving notifications.

In one embodiment of the present invention, some of the users (such as technical support centers) may use these notifications just as advisories (a new technical tip was added). In another embodiment of the present invention, other users such as technical writers, may use the notifications as a trigger to update current documentation whether it means adding new content or correcting existing content. In yet another embodiment of the present invention, development engineers may use the auto email notifications as a means to clarify messages and imbed those resulting clarifications into the next release of software. In still another embodiment of the present invention, the auto email notification may be utilized with the building of both online and printed document.

It should be further appreciated that by virtue of the auto email notification feature of the IDD (interactive dynamic documentation web site) 40, any user enrolled in auto email notification is thereby notified of all changes with regard to the content or document with which they are associated. Additionally, the contributor IDs are tracked for all content contributions whether in the form of new content, corrections to content, validation of content, and comments on content. This is used to provide the means for follow up queries to the contributor as well as enabling the ability to produce reports on contributions.

Utilization of the Interactive Dynamic Documentation Web Site

Figure 6A:
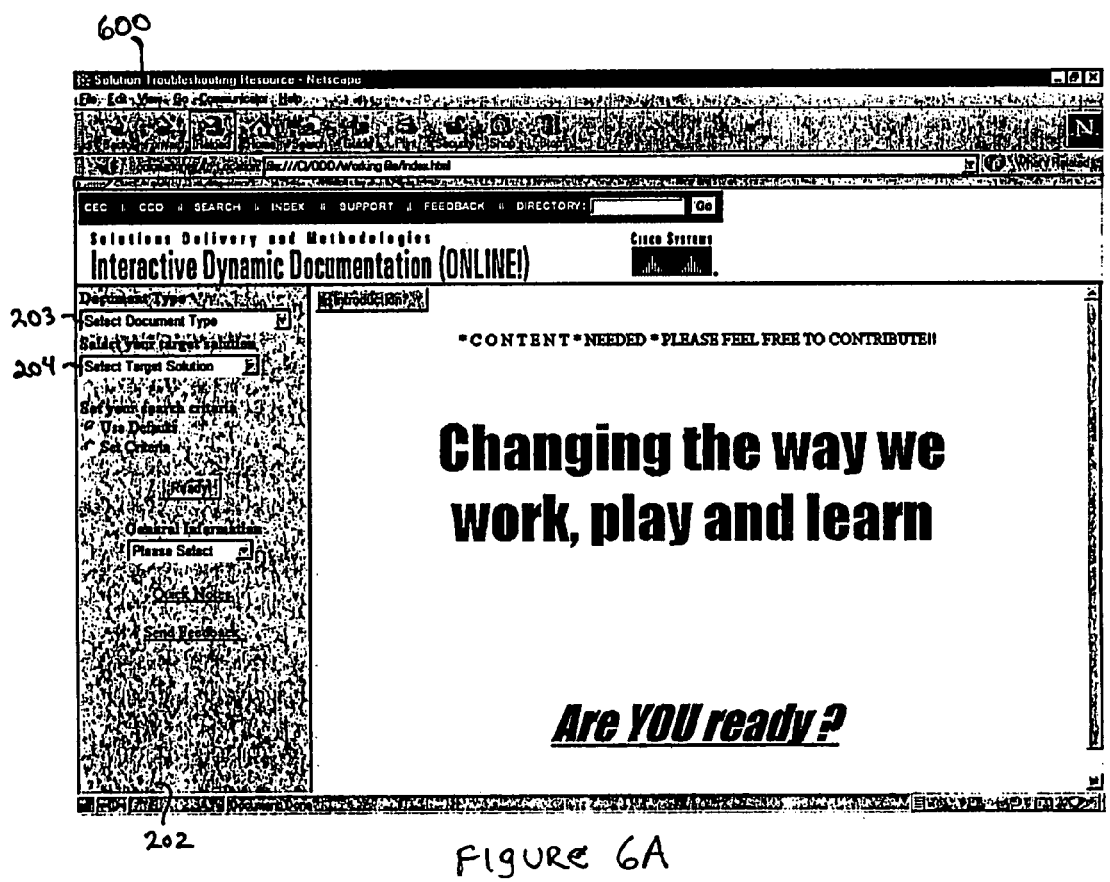
FIG. 6A is a computer generated screen shot depicting a web page, analogous to FIG. 5, in accordance with one embodiment of the present invention.

In FIG. 6A, shown is index page 200 of IDD (interactive dynamic documentation web site) 40, in one embodiment of the present invention. Index page 200 is the initial web page displayed to a user subsequent to that user logging on and having access to IDD 40 granted. Index page 200 of FIG. 6A is analogous to index page 200 of FIG. 5.

Figure 6B:
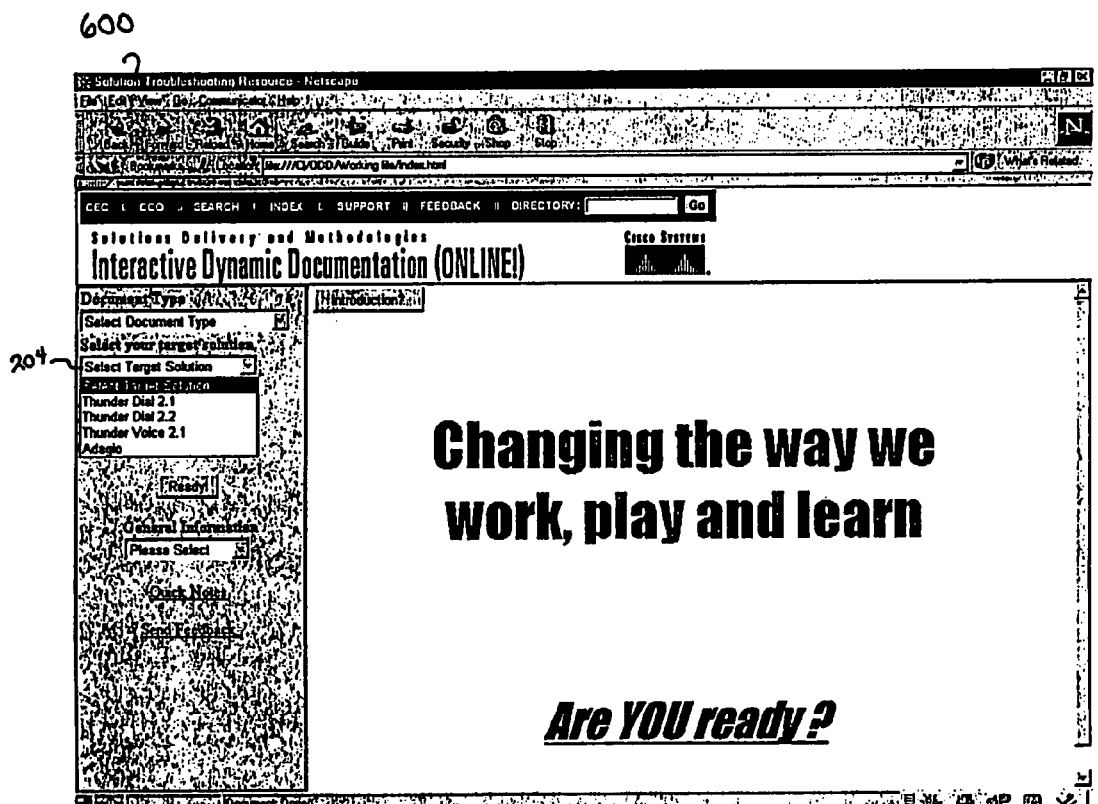
FIG. 6B is a computer generated screen shot sequentially depicting the web page of FIG. 6A, in accordance with one embodiment of the present invention.

In FIG. 6B, a continuation of FIG. 6A, in one example of one embodiment of the present invention, a user might desire specific information on a target solution such as ThunderDial 2.1. As such, the user activates pull down menu 204, scrolls down to and selects the solution relating to ThunderDial 2.1, as shown in FIG. 6B. Once the user has selected, in this example, the ThunderDial 2.1 solution, it is then displayed in the text window of pull down menu 204, as shown in FIG. 7.

It should be appreciated that once a solution or product has been targeted, all the data that is subsequently retrieved and presented to the user will be relevant to this solution, product, and/or release.

Figure 7:
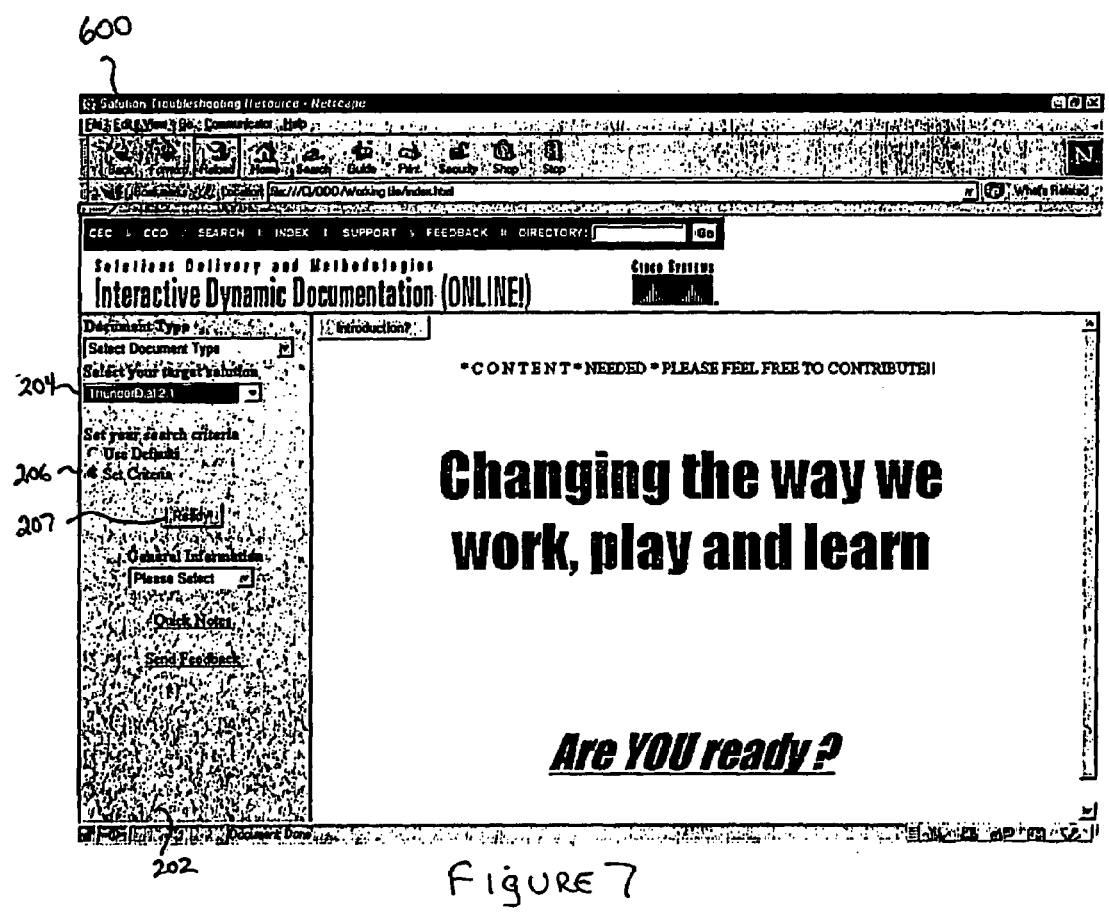
FIG. 7 is computer generated screen shot sequentially depicting the web page of FIG. 6B, in accordance with one embodiment of the present invention.

FIG. 7, a continuation of FIG. 6B, shows that the user has chosen to further define the criteria by selecting set criteria radio button 206, as indicated by the black dot within set criteria radio button 206, which simultaneously de-selects default radio button 205, in one embodiment of the present invention. Once the user has chosen the target solution of, in this example, ThunderDial 2.1, and has opted to further define the scope of the information by selecting set criteria radio button 206, then the user clicks on ready button 207, as shown in FIG. 7. Once the user has clicked on ready button 207, an additional panel, disposed within region 211, is presented to the user, as shown in FIG. 8.

In FIG. 8, a continuation of FIG. 7, the new panel disposed within region 211 contains three additional pull down menus, in one embodiment of the present invention. In this example, each pull down menu relates to one product, where each product is a component of the ThunderDial 2.1 solution.

Figure 9:
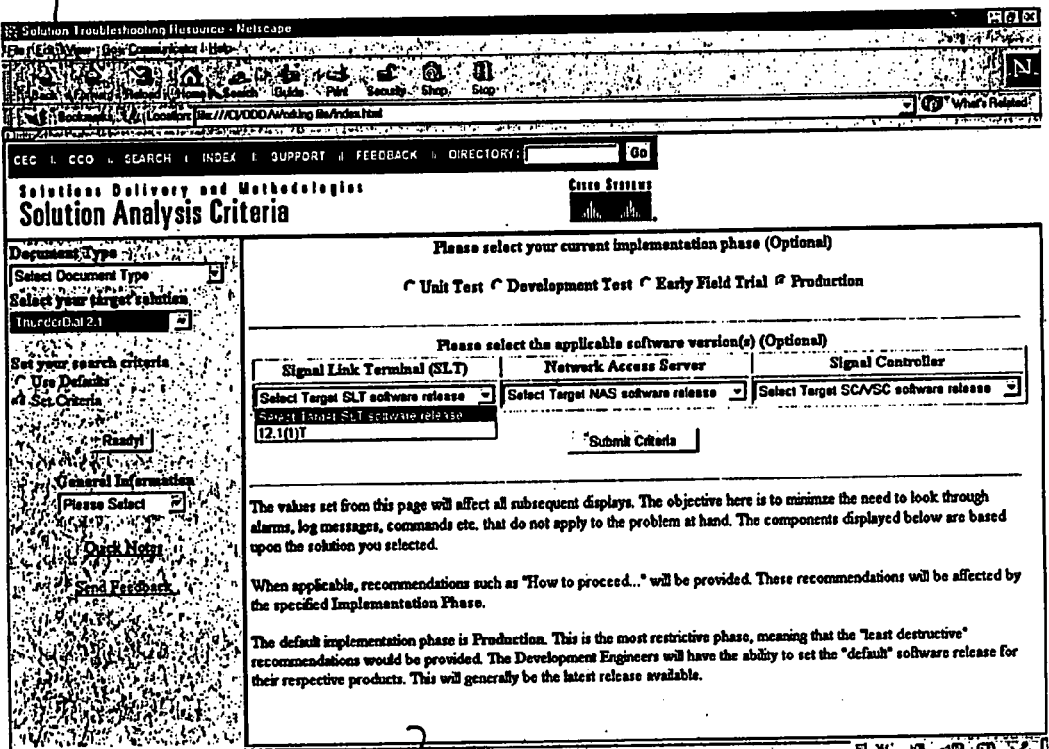
FIG. 9 is a computer generated screen shot sequentially depicting the web page of FIG. 8, in accordance with one embodiment of the present invention.
Figure 10:
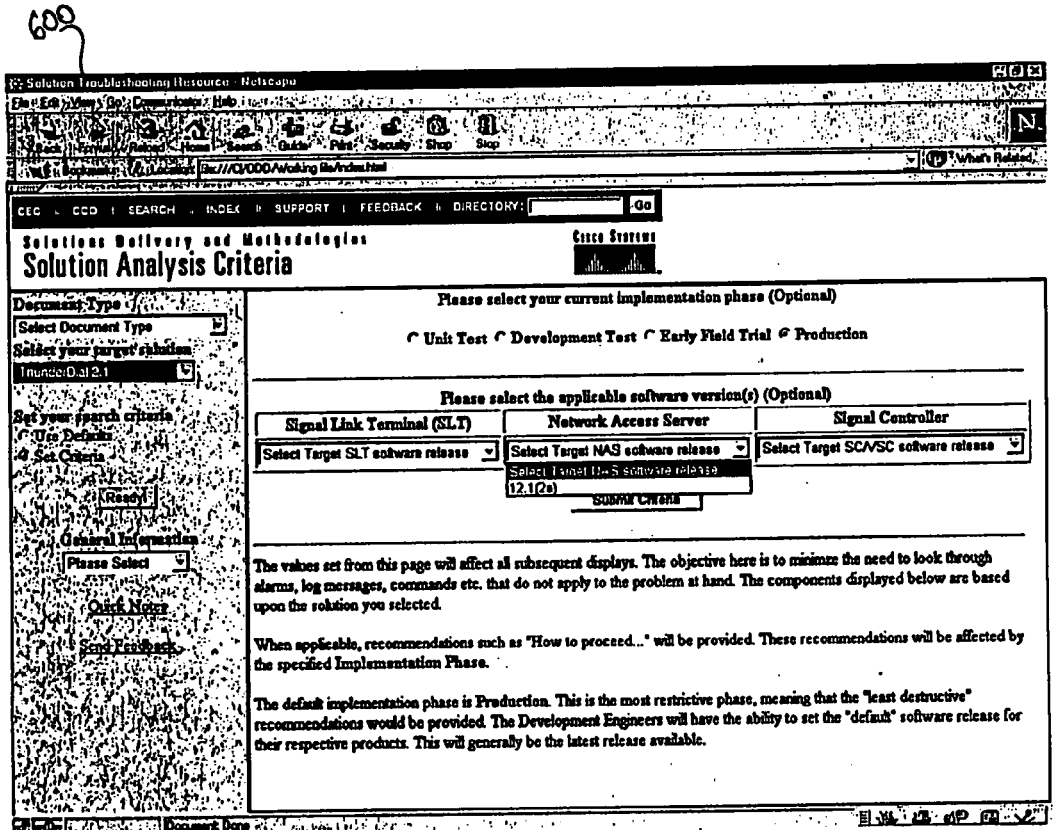
FIG. 10 is a computer generated screen shot sequentially depicting the web page of FIG. 9, in accordance with one embodiment of the present invention.
Figure 11:
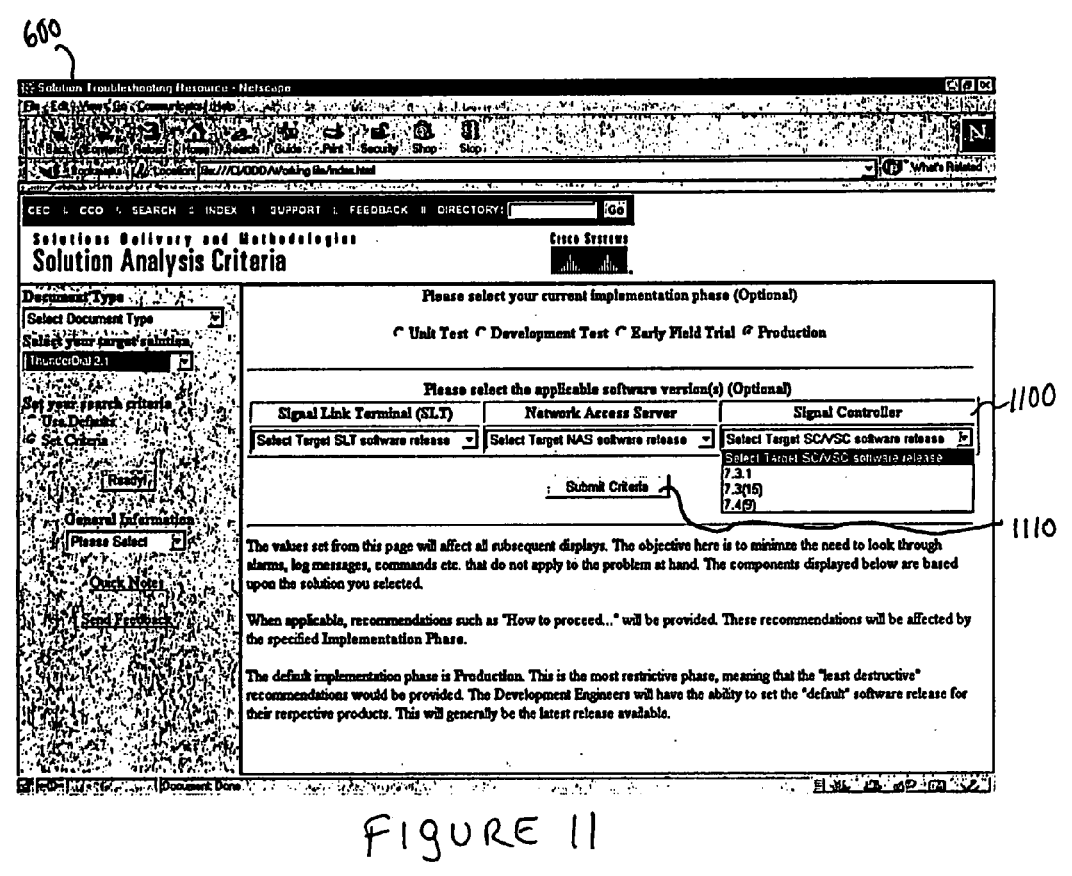

In chronological order, FIGS. 9, 10 and 11, in a continuation of FIG. 8, depict a user now activating the above mentioned pull down menus within region 211, in one embodiment of the present invention in one embodiment of the present invention.

In FIG. 9, the pull down menu on the left is initiated.

In FIG. 10, the center pull down menu is initiated.

In FIG. 11, the right pull down menu is initiated.

It should be appreciated that, while only one or two topics are contained within each of the previous three pull down menus, innumerable additional topics may be contained within numerous additional pull down menus. Additionally, numerous other pull down menus representing other topics may be also be present within region 211.

Referring to FIG. 11, the user would then select the desired component. In this example of one embodiment of the present invention, right pull down menu 1100 containing the signal controller sub-section was selected. The particular product was the SC/SVC software release. Activating the selection triggers the retrieval of a new web page 1200 and that page is subsequently displayed to the user, as shown in FIG. 12.

Figure 12:
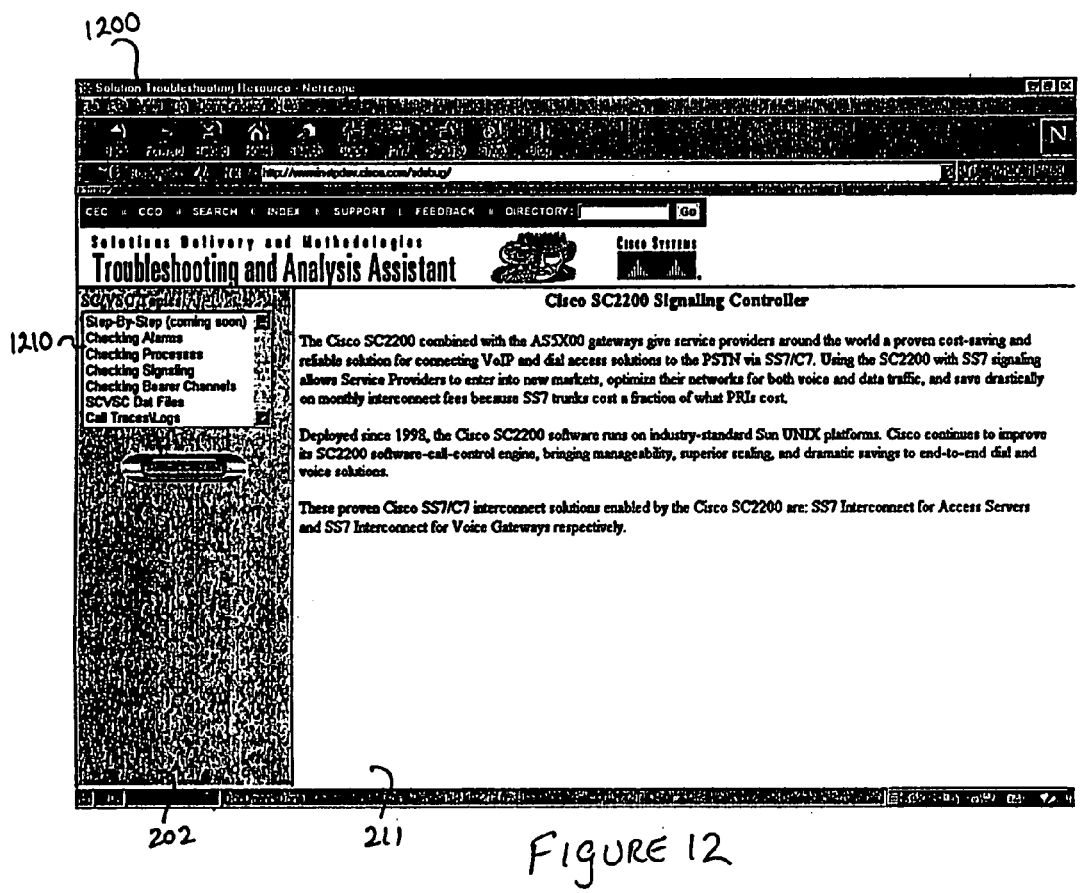
FIG. 12 is a computer generated screen shot depicting another web page of the present invention, in accordance with one embodiment of the present invention.

In FIG. 12, shown is web page 1200, in one embodiment of the present invention. Selectable text field 1210 is shown as disposed within region 202, in one embodiment of the present invention. In this example, selectable text field 1200 contains specific topics of subject matter related to the signal controller SC/SVC software release previously chosen. In one example, the topics may consist of dat files, or bearer channels, or others, as shown in FIG. 12. It should be noted that an almost endless list of topics may be inserted into selectable text field 1210 for retrieval by a user. The topics presented should be not be considered exhaustive, but rather used as an example.

Also present in FIG. 12, and disposed within region 211, is text that provides a general overview of the selected software from FIG. 11. Continuing in this example, the user then selects the topic "checking alarms" from selectable text field 1210. This triggers the retrieval of another new web page related to the previous selections, which is shown in FIG. 13, in one embodiment of the present invention.

Figure 13:
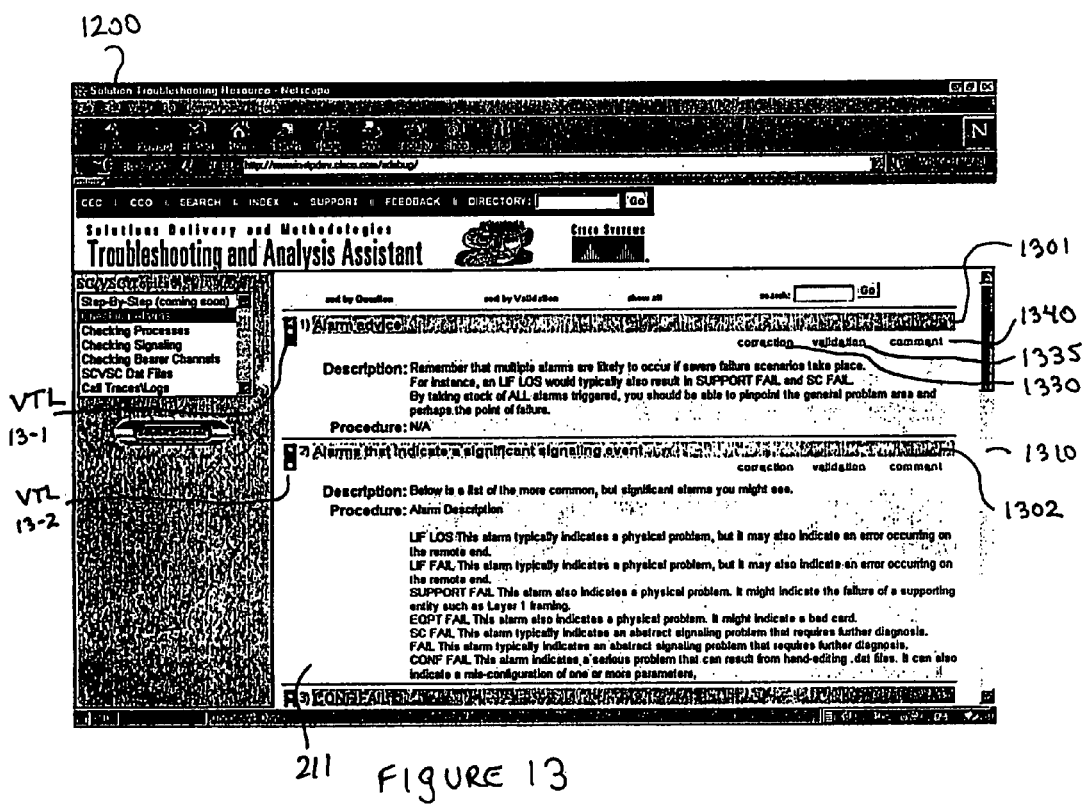
FIG. 13 is a computer generated screen shot depicting another web page of the present invention, in accordance with one embodiment of the present invention.

In FIG. 13, information regarding alarms related to the SC/SVC signal controller software release, the previously selected subject from FIG. 12, is displayed within region 211 of web page 1300. In this example, in one embodiment of the present invention, 1)alarm advice 1301 and 2)alarms that indicate a significant signaling event 1302, two topics of pertinence to the SC/SVC signal controller software release are displayed. Numerous additional alarm notices are present, but not visible due to inherent physical limitations of the display screen. This is evidenced by the presence of scroll bar 1310, disposed on the right side of region 211, which, when utilized, would reveal the additional alarm notices. Additionally, disposed beneath topic headings 1301 and 1302, and oriented to the right of region 211, are, from left to right, correction link 1330, validation link 1335. and comment link 1340. From these links, a user may correct, validate, and or comment on the content displayed, as shown in FIG. 13.

Still referring to FIG. 13, shown to the left of "alarm advice" 1 and "alarms that indicate" 2 are two small rectangles, VTL (validating traffic light) 13-1 and VTL (validating traffic light) 13-2, respectively, wherein each VTL (validating traffic light) contains three small illuminatable openings for visually depicting the state of the information with respect to validity, in one embodiment of the present invention.

Interpretation of the Validating Traffic Light

Figure 14:
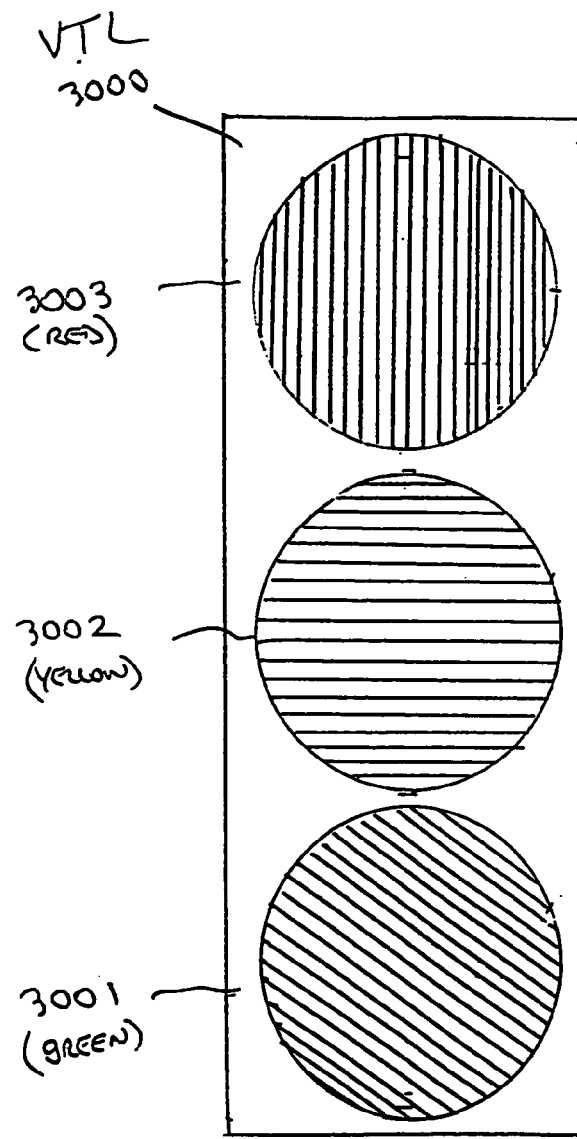
FIG. 14 is an illustrated perspective of a validating traffic light utilized in the present invention, in accordance with one embodiment of the present invention.

Referring to FIG. 14, shown is an illustrated perspective view of VTL (validating traffic light) 3000, in one embodiment of the present invention. VTL 3000 is analogous to the VTLs disposed within the web pages that comprise IDD (interactive dynamic documentation web site) 40. Top illuminatable opening 3003, shown as having vertical lines to represent the color red, when illuminated, is indicative of the content having been reviewed and given a negative validation. Middle illuminatable opening 3002, shown as having horizontal lines to represent the color yellow, when illuminated, is indicative of new content, content that has yet to be reviewed, or undetermined content, and, as such, should be used with caution. Top illuminatable opening 3001, shown as having diagonal lines to represent the color green, when illuminated, is indicative of the content having been reviewed and given a positive validation.

Additionally, the determination of illumination is dependent on what is being validated. In one embodiment of the present invention, a particular topic's validation is configured to be based upon an average of the submitted corrections, validations, comments, or submissions, such that when a majority of submissions related to that particular topic is of a positive nature, a green indication is given. Conversely, had a majority of submissions related to that particular topic been of a negative nature, a red indication would be given. In another embodiment of the present invention, a particular topic's validation is configured to be based on a percentage of submitted corrections, validations, comments, or submissions, such that, of the total number of validations received, when validations of a positive nature reached a pre-determined percentage level of, e.g., 75%, a green indication would be given. In the same embodiment, it may only require a pre-determined percentage level of, e.g., 15% to trigger the red indication to be given.

It should further be appreciated that in another embodiment of the present invention, color intensity could be integrated into the determination of the illumination, such that a brighter green would be an indication of a greater number of positive validations has been submitted. In another embodiment, a brighter red would be indicative of a greater number of negative validations had been submitted. In still another embodiment, a blinking functionality could be implemented.

It should be further appreciated that while the colors red, yellow, and green are used in the invention, other colors may be used, although not recommended, due to the easily recognized functional representation of the colors red, yellow, and green.

It should be appreciated that while illuminatable openings 3003, 3002, and 3001, in the present embodiment of the present invention, are shown as being circular is shape, the illuminatable openings may be of almost any shape, provided the shape is such that the indicated validation may be interpreted as described.

Accordingly, now referring back to FIG. 13, VTL (validating traffic light) 13-1, shown as the VTL for "alarm advice" 1, is shown as having the top most opening illuminated, which indicates, as previously described above, that the information (content) regarding "alarm advice" 1 has been reviewed and has been given a negative validation, and as such, should not be used. VTL (validating traffic light) 13-2, shown as the VTL for "alarms that indicate" 2, is shown as having the middle opening illuminated, which indicates, as previously described above, that the information (content) regarding "alarms that indicate" 2 has not yet been validated, either because it is new information (content) or that it has not yet been reviewed, and, as such, should be used with caution.

Adding Content for Validation

Figure 15:
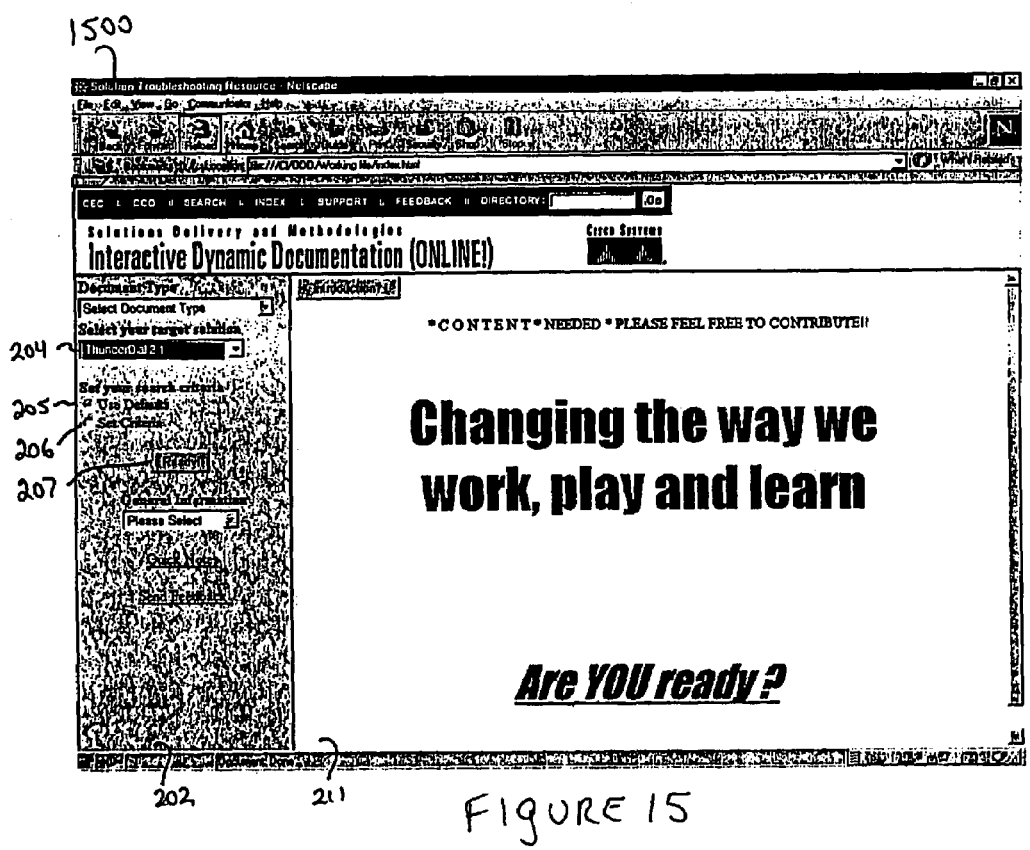
FIG. 15 is computer generated screen shot of a web page analogous to the web pages of FIGS. 5, 6A, 6B, and 7, in accordance with one embodiment of the present invention.

Referring now to FIG. 15, shown is webpage 1500, in one embodiment of the present invention. Web Page 1500 is analogous to web page 600 of FIG. 7, including the selected target solution of ThunderDial 2.1, as shown in PDM (pull down menu) 204. In this example, instead of selecting set criteria radio button 206, a user has selected use defaults radio button 205. Selecting use defaults radio button 205, as indicated by the black dot within use defaults radio button 205, also simultaneously de-selects set criteria radio button 205, in one embodiment of the present invention. Once a user has made their proper selections, and clicks on ready button 207, a new web page 1600 is displayed, as shown in FIG. 16, in one embodiment of the present invention.

Referring to FIG. 16 which shows web page 1600, the web page displayed in response to the ready button being clicked on from FIG. 15. In web page 1600, shown as disposed within region 202 are multiple PDMs (pull down menus). Shown as disposed within region 211 is a general overview of the selected solution from FIG. 15, which in this example, is the ThunderDial 2.1 solution, in one embodiment of the present invention.

Figure 17:
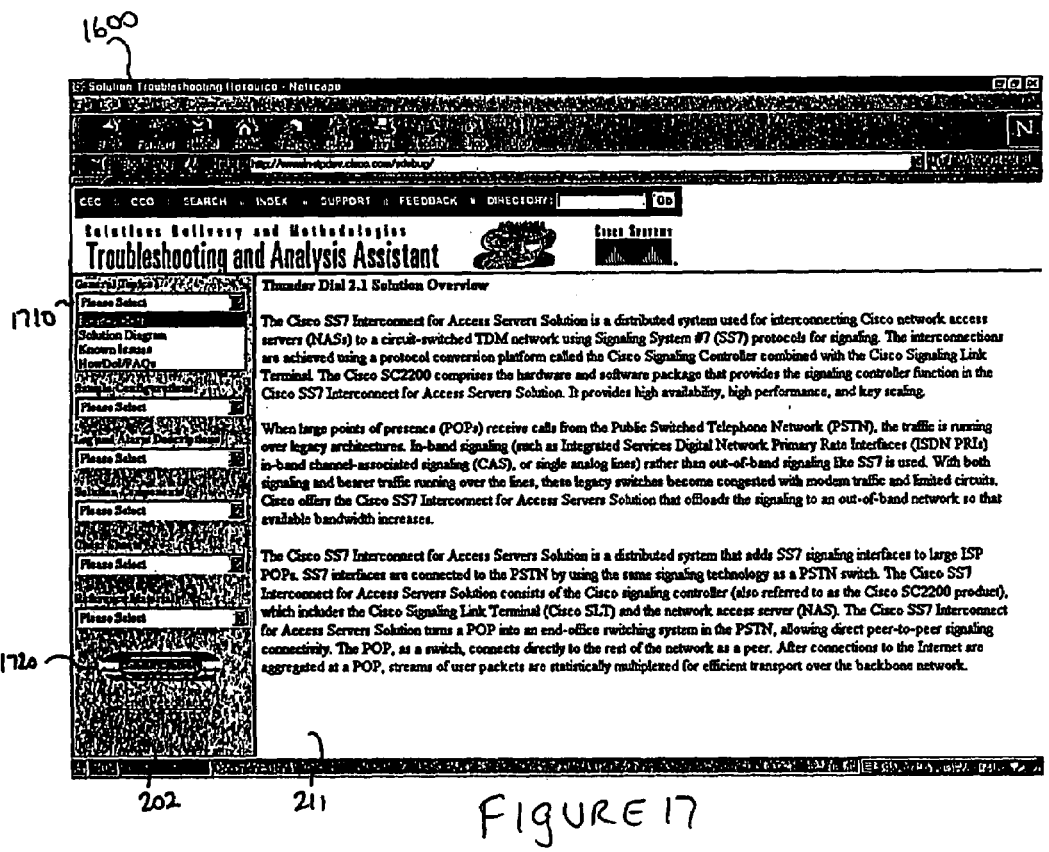
FIG. 17 is a computer generated screen shot sequentially depicting the web page of FIG. 16, in accordance with one embodiment of the present invention.

In FIG. 17, shown is a user selecting from the general topics presented in PDM (pull down menu) 1710, in one embodiment of the present invention. From this PDM, the user, in this example, has chosen the How Do I topic, and has clicked on submit content function button 1720. Subsequent to the clicking of submit content button 1720, a new web page is displayed to the user, as shown in FIG. 18.

Figure 18:
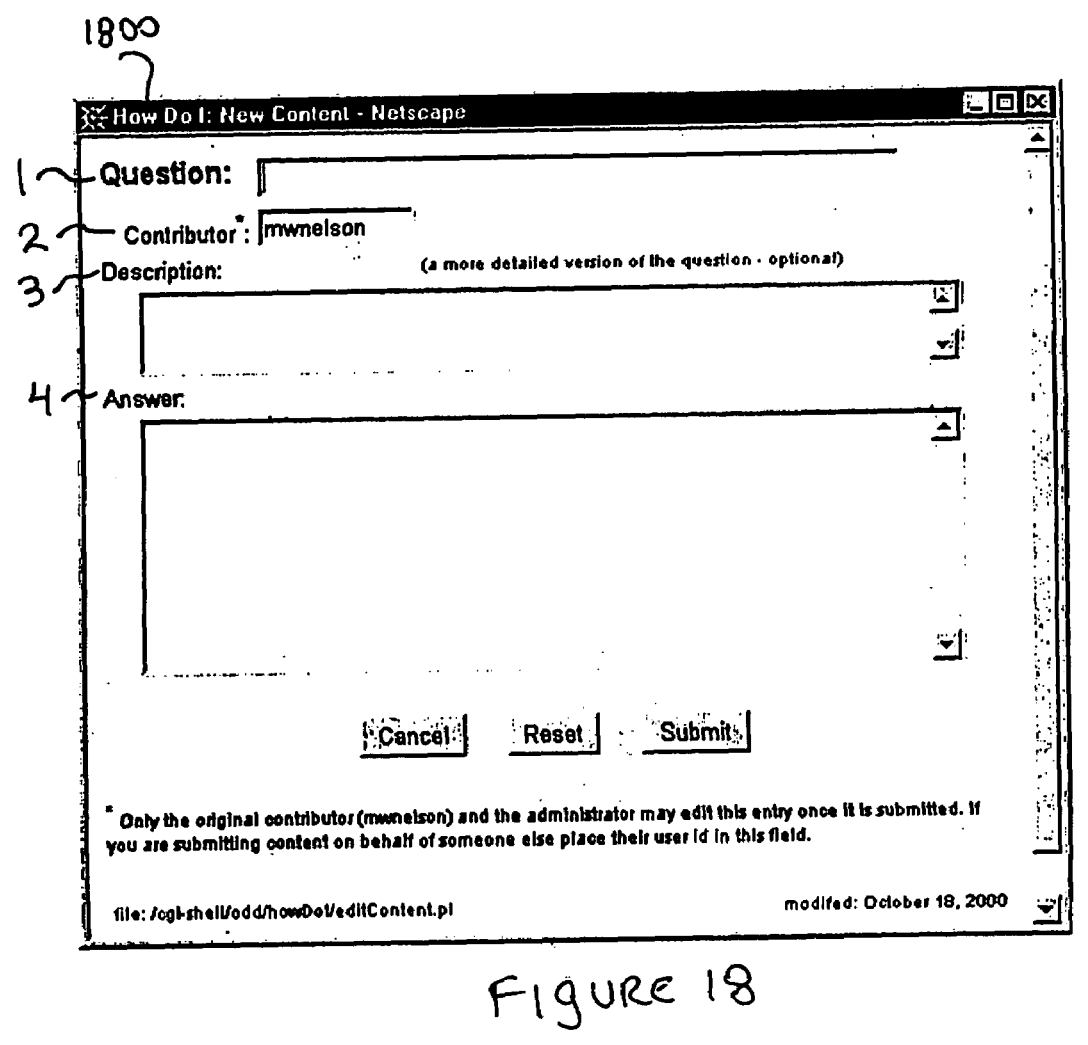

Referring to FIG. 18, shown is web page 1800, the page subsequently displayed after the clicking of submit content button 1720 of FIG. 17, in one embodiment of the present invention. Web page 1800 is of a different form than the web pages previously described above. It is designed such that the text entry fields contained therein are configured to receive text input from a user wishing to submit new content. From top to bottom, the text entry fields provided are: question field 1, contributor field 2, description field 3, and answer field 4. At this junction, a user would input the appropriate content into the appropriate text entry fields provided by IDD 40. This is shown in FIG. 19.

Referring to FIG. 19, shown is web page 1800, analogous to web page 1800 of FIG. 18. In this example, in one embodiment of the present invention, the user, contributor mwnelson, has inputted the new content into the appropriate text entry fields. In the present example, the user is submitting new content related to "changing the SNMP manager with and without TCT." After the input has been entered, the user clicks on the submit button, disposed toward the bottom right of web page 1800, in one embodiment of the present invention. Subsequent to the clicking of the submit button, the new content is immediately available for review, as is shown in FIG. 20.

It should be appreciated that, in one embodiment of the present invention, when a user submits content, they can be placed in the auto email notification system, as discussed previously. It should be pointed out that the auto email notification is generally presented as an option to the contributor, such that the user can deselect or uncheck this feature. Therefore, the provider (author) of the content, in this example, mwnelson, having acquiesced to be enrolled in the auto email notification system, would be notified when someone initiates an event, such as submitting a correction, comment, or validation to the content.

Correction of Content

Figure 20:
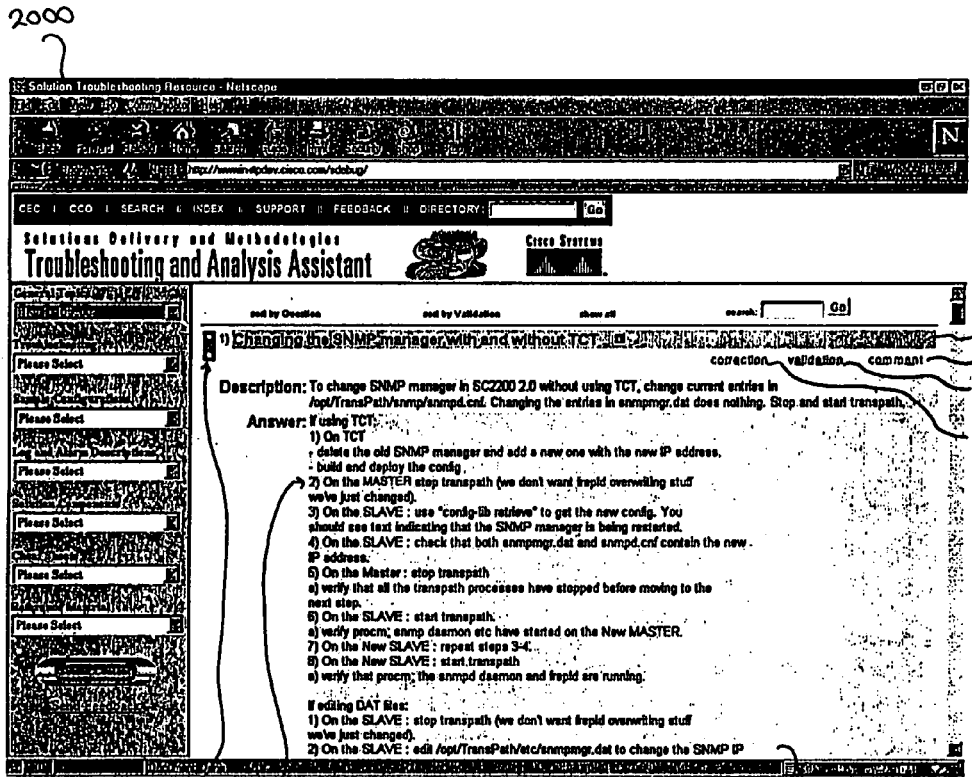
FIG. 20 is a computer generated screen shot of a web page in a sequential continuation of the computer generated screen shot depicting the web page of FIG. 19, in accordance with one embodiment of the present invention.

Referring now to FIG. 20, shown is web page 2000, in one embodiment of the present invention. Web page 2000 shows the content, newly submitted, as described in FIG. 19, as it would appear to a user looking for an answer to the FAQ (frequently asked question), How is changing the SNMP manager with and without TCT accomplished? It should be noted that to the left of topic heading 2020, is VTL (validating traffic light) 2010, analogous to the function of VTL 3000 of FIG. 14. VTL 2020 is shown as having the middle opening illuminated, and as described in FIG. 14, is reflective of new or yet to be reviewed content, and, as such, should be used with caution. It should also be noted that to the right of the titled topic, is icon 2800. Icon 2800 is a feature of IDD (interactive dynamic documentation web site) 40. Icon 2800 is present, in this example, as an indicator that other users have submitted comments to this topic, changing the SNMP with and without TCT. Icon 2800, when clicked on, will retrieve a listing of all the comments that have been submitted regarding this specific topic, and display them to the user.

It should be appreciated that if a user wishes to submit a correction, a validation, or a comment, with regard to the content displayed, a user needs only to click on one of the provided links disposed beneath the right side of topic heading 2020. In this example, in one embodiment of the present invention, they are from left to right, correction link 2030, validation link 2035, and comment link 2040.

Still with reference to FIG. 20, in the current example, a user has determined that a part of the newly submitted content was, in the present example, incorrect. In this example, in one embodiment of the present invention, item2 2050 in the answer field contains the word MASTER, when in fact the word should be SLAVE. To facilitate a correction, the user would then click on correction link 2030, and would subsequently be presented with a new web page, as shown in FIG. 21.

Figure 21A:
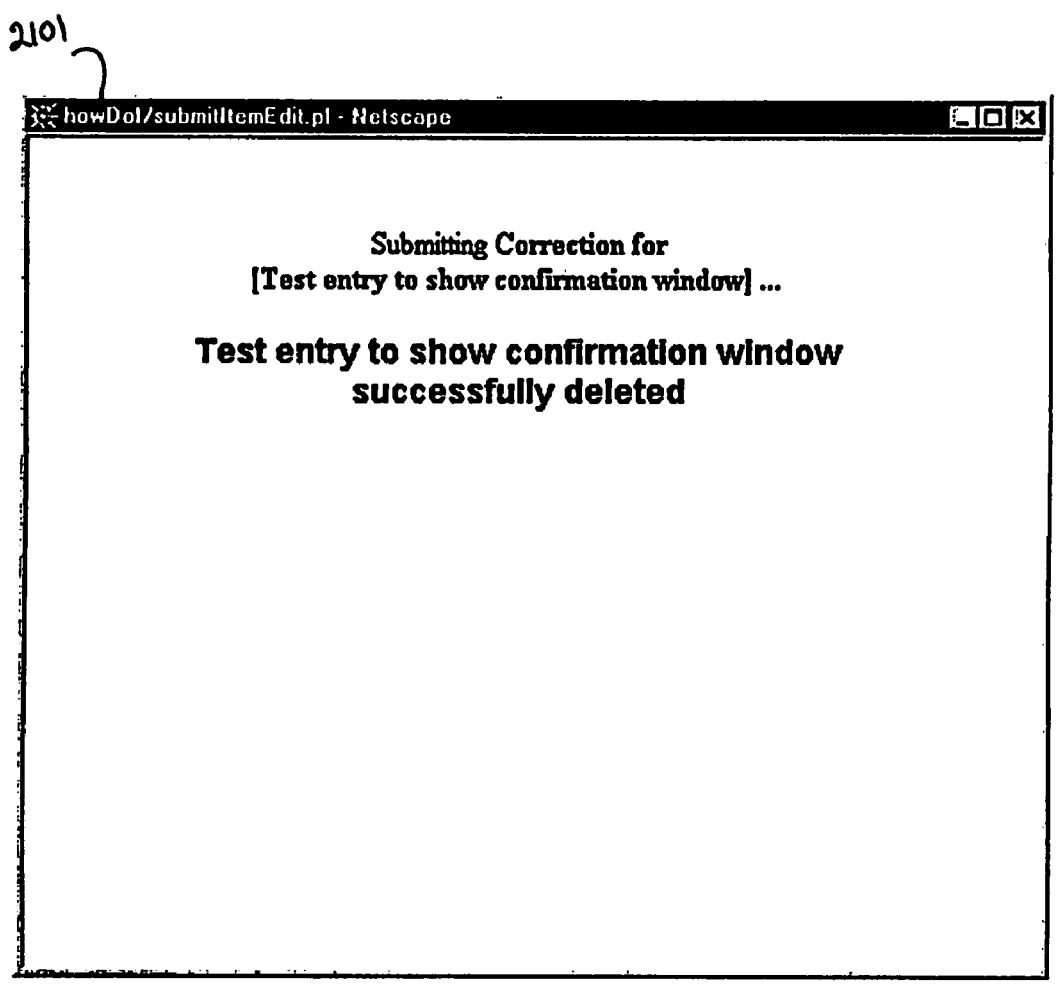
FIG. 21A is a computer generated screen shot sequentially depicting the web page of FIG. 21, in accordance with one embodiment of the present invention.

Referring now to FIG. 21, shown is web page 2100, in one embodiment of the present invention. Shown is the correction of the content, previously submitted by mwnelson, and now corrected by contributor xuchen, as shown in contributor text entry field 2. In answer text entry field 3, item2 2150, shown is the word MASTER having been detected as erroneous, removed, and replaced with the word SLAVE, thereby providing a correction of content. Once the correction to the content has been inputted into the text entry field, and subsequently submitted by clicking on the submit button disposed toward the bottom right, a user would be presented with a web page 2101, as shown in FIG. 21A. FIG. 21A is a page that acknowledges the receipt of the submitted correction.

Figure 22:
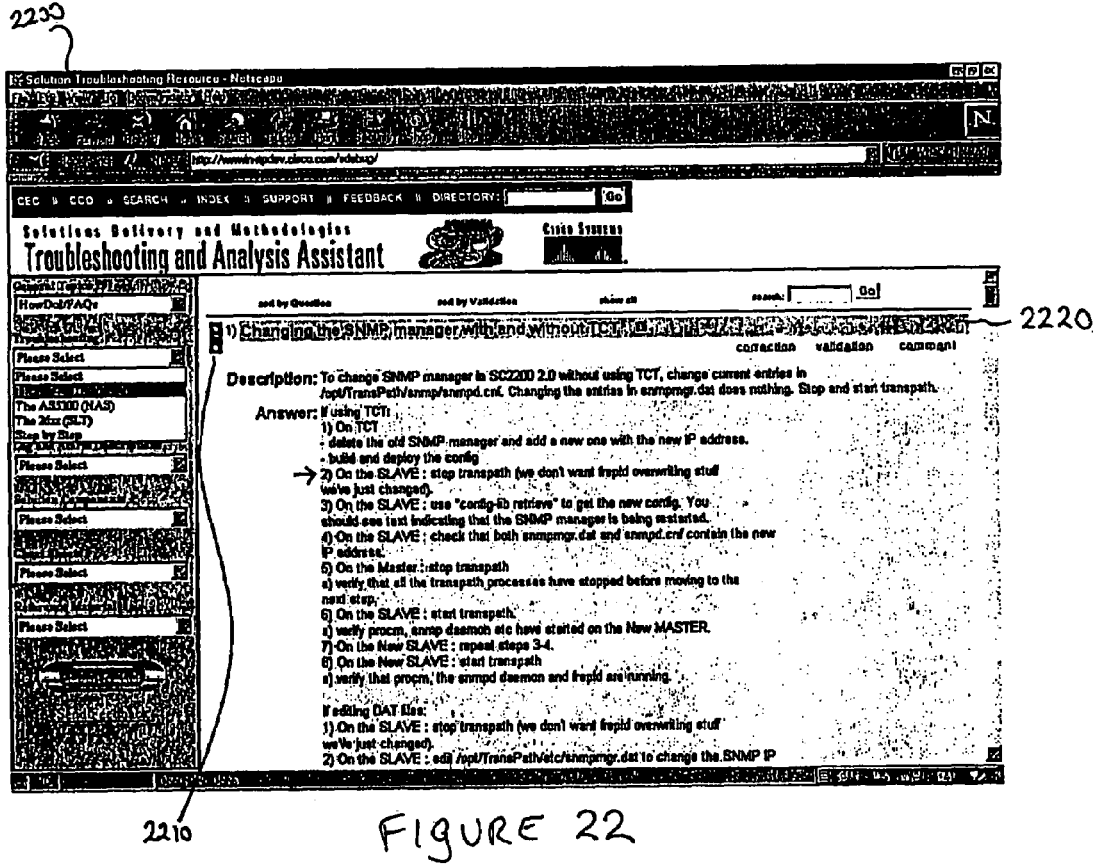
FIG. 22 is a computer generated screen shot of a web page in a sequential continuation of the computer generated screen shot depicting the web page of FIG. 21A, in accordance with one embodiment of the present invention.

Referring now to FIG. 22, shown is web page 2200, in one embodiment of the present invention. The content, reflective of having been corrected as described in FIG. 21, is displayed to a user. VTL (validating traffic light) 2210, analogous to VTL 3000 of FIG. 14, is shown to the left of topic heading 2210, and is depicted a having the middle opening illuminated. As such, VTL 2210 is still indicating a use with caution validation. In this embodiment, VTL 3000 is configured to be based on submission of validation, not correction, and therefore has remained unchanged.

It should be appreciated that, in one embodiment of the present invention, when a user submits correction to content, they may be placed in the auto email notification system, as discussed previously. It should be pointed out that the auto email notification is generally presented as an option to the contributor, such that the user can deselect or uncheck this feature. Therefore, the author of the correction, in this example, xuchen, having acquiesced to be enrolled in the auto email notification system, would be notified when someone initiates an event, such as submitting a correction, comment, or validation to that correction. Additionally, the provider (author) of the content on which this correction was made, in this example, mwnelson, would also be notified that someone had submitted a correction to the content they provided.

Commenting on Content

Referring now to FIG. 23, shown is web page 2300, in one embodiment of the present invention. In this example, the steps leading to the display of web page 2300 are analogous to the steps leading to the display of web page 2100 of FIG. 21, where a correction to content was shown. In this example, web page 2300 of FIG. 23, a comment to content is being made. In this example of one embodiment of the present invention, the content, while it is viewable to the user, is displayed in a read-only capacity and as such, in unalterable in this instance. Text entry fields for making corrections are not provided, as they were in FIG. 21. Text entry field 1, disposed toward the bottom of web page 2300 is provided for the inputting of comments.

Still referring to FIG. 23, it should be appreciated that had a web page, analogous to web page 2000 of FIG. 20, been shown pertaining to the topic of "disable sync on two VSCs in order to make changes on one box", a VTL (validating traffic light) related to that topic would have been provided. Since this content had yet to be reviewed or commented upon, the provided VTL would have had the middle opening illuminated, and as discussed in FIG. 14, indicating the content should be used with caution. In this instance, comments to be inputted would be entered in text entry field 1 and submitted. Subsequent to the submission of the comments, a new web page 2400 would be displayed, as shown in FIG. 24.

Referring to FIG. 24, shown is web page 2400, in one embodiment of the present invention. Shown as disposed toward the bottom of web page 2400 are text entry fields 1 and 2 which are reflective of comments submitted with regard to the topic, "disable sync on two VSCs in order to make changes on one box," as described in FIG. 23.

It should be appreciated that once the comments have been submitted, a user looking to have an answer to the topic, "disable sync on two VSCs in order to make changes on one box," as described in FIG. 23, would presented with a web page analogous to web page 2200 of FIG. 22.

It should be appreciated that when a user submits a comment to content, they may be placed in the auto email notification system, as discussed previously. It should be pointed out that the auto email notification is generally presented as an option to the contributor, such that the user can deselect or uncheck this feature. Therefore, the author of the comment, having acquiesced to be enrolled in the auto email notification system, would be notified when someone initiates an event, such as submitting a correction, comment, or validation to that comment. Also, because this was a comment to content, this comment was added to the listing of submitted comments accessible by clicking on icon 2800. Additionally, the provider (author) of the content on which this comment was made would also be notified that a user had commented on their content.

Validation of Content

Figure 25:
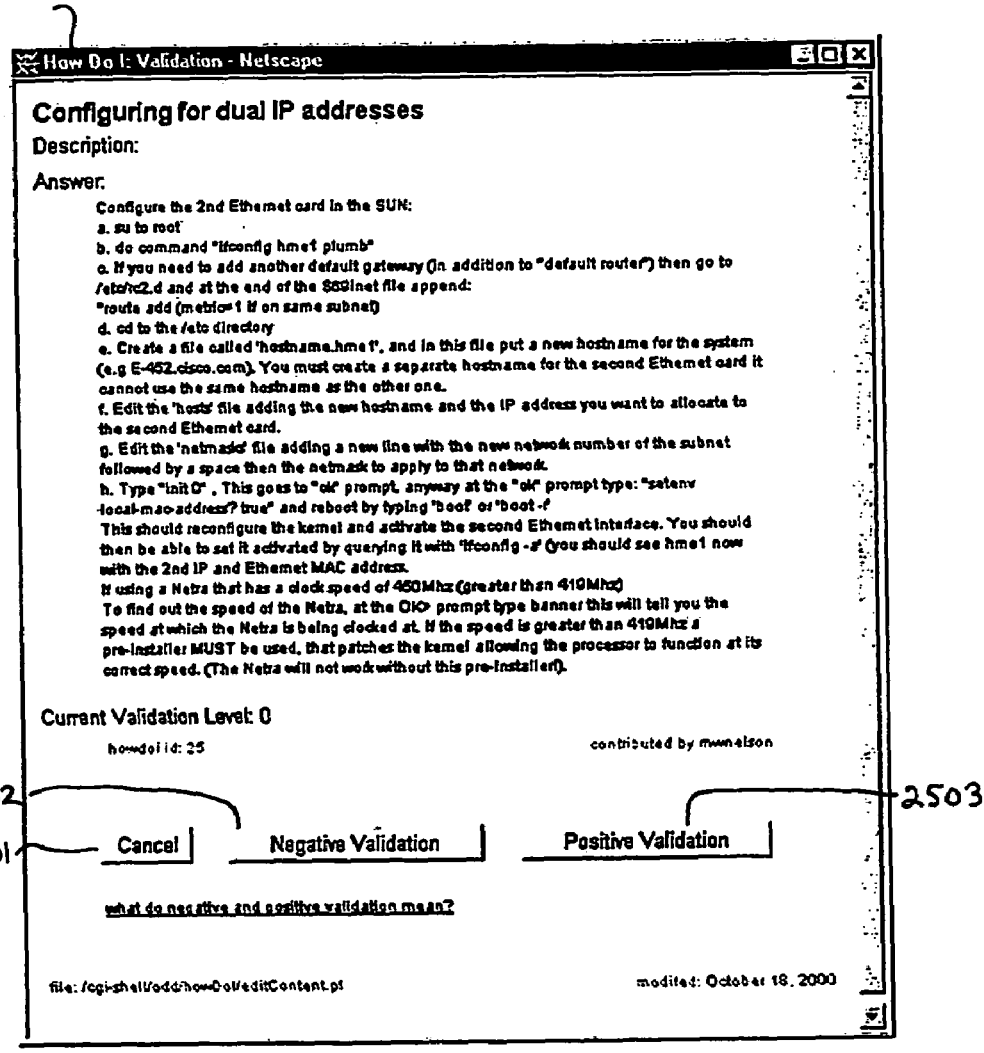
FIG. 25 is a computer generated screen shot of a web page in a sequential continuation of the computer generated screen shot depicting the web pages of FIGS. 13, 20, and 22, in accordance with one embodiment of the present invention.

Referring to FIG. 25, shown is web page 2500, in one embodiment of the present invention. In this example, web page 2500 is displayed when a user utilizes the validation link contained within IDD 40. In one example, validation link 1335 of web page 1200 of FIG. 13 may be used to validate the content regarding the topic alarm advice 130. In another example, validation link 2035 of web page 2000 of FIG. 20 may be used to validate the content regarding the topic changing the SNMP manager with and without TCT 2020. In the present example, the topic of configuring for dual IP addresses, as shown at the top of web page 2500 of FIG. 25, is being validated. It should be appreciated that the content displayed on web page 2500 would be analogously displayed on a web page analogous to web page 13, with the topic appropriately displayed. In this example, a validation to content is being made. In this example of one embodiment of the present invention, the content as displayed is in a read-only state.

Still referring to FIG. 25, it should be appreciated that had a web page, analogous to web page 2000 of FIG. 20, been shown pertaining to the topic of configuring for dual IP addresses, a VTL (validating traffic light) related to that topic would have been provided. Since this content had yet to be reviewed or commented upon, the provided VTL would have had the middle opening illuminated, indicating new or yet to be reviewed content, and, as such, should be used with caution.

Referring still to FIG. 25, shown as disposed along the bottom of the page, from left to right are, cancel button 2501, negative validation button 2502, and positive validation button 2503. If, after reading the content, a user determined the content is valid content, the user would click on positive validation button 2503, which would trigger the VTL associated with the topic to change from a yellow indication to a green indication. In another example, if a user determines that the content is not valid, the user would click on negative validation button 2502, which would trigger the VTL associated with the topic to change from a yellow indication to a red indication, which indicated that the content, in this example, is not valid content.

It should be appreciated that once the validation has been submitted, a user looking to have an answer to the topic, configuring for dual IP addresses, as described in FIG. 23, would be presented with a web page analogous to web page 2200 of FIG. 22. In this example, in one embodiment of the present invention, had the user positively validated the content, the VTL associated with the topic would have the bottom opening illuminated, indicating positive validation. On the other hand, had the user negatively validated the content, the VTL associated with the content would have the top opening illuminated, indicating negative validation.

It should be appreciated that the function of the validating traffic light, in the present invention, is implemented by an invoked algorithm. The algorithm is disposed with IDD (interactive dynamic documentation web site) 40, in one embodiment of the present invention.

It should further be appreciated that when a user submits a validation to content, they may be placed in the auto email notification system, as discussed previously. It should be pointed out that the auto email notification is generally presented as an option to the contributor, such that the user can deselect or uncheck this feature. Therefore, the author of the validation, having acquiesced to be enrolled in the auto email notification system, may be notified when someone initiates an event, such as submitting a correction, comment, or validation to that validation. Additionally, the provider (author) of the content on which this validation was made would also be notified that someone had submitted a validation to the content they provided.

Figure 26:
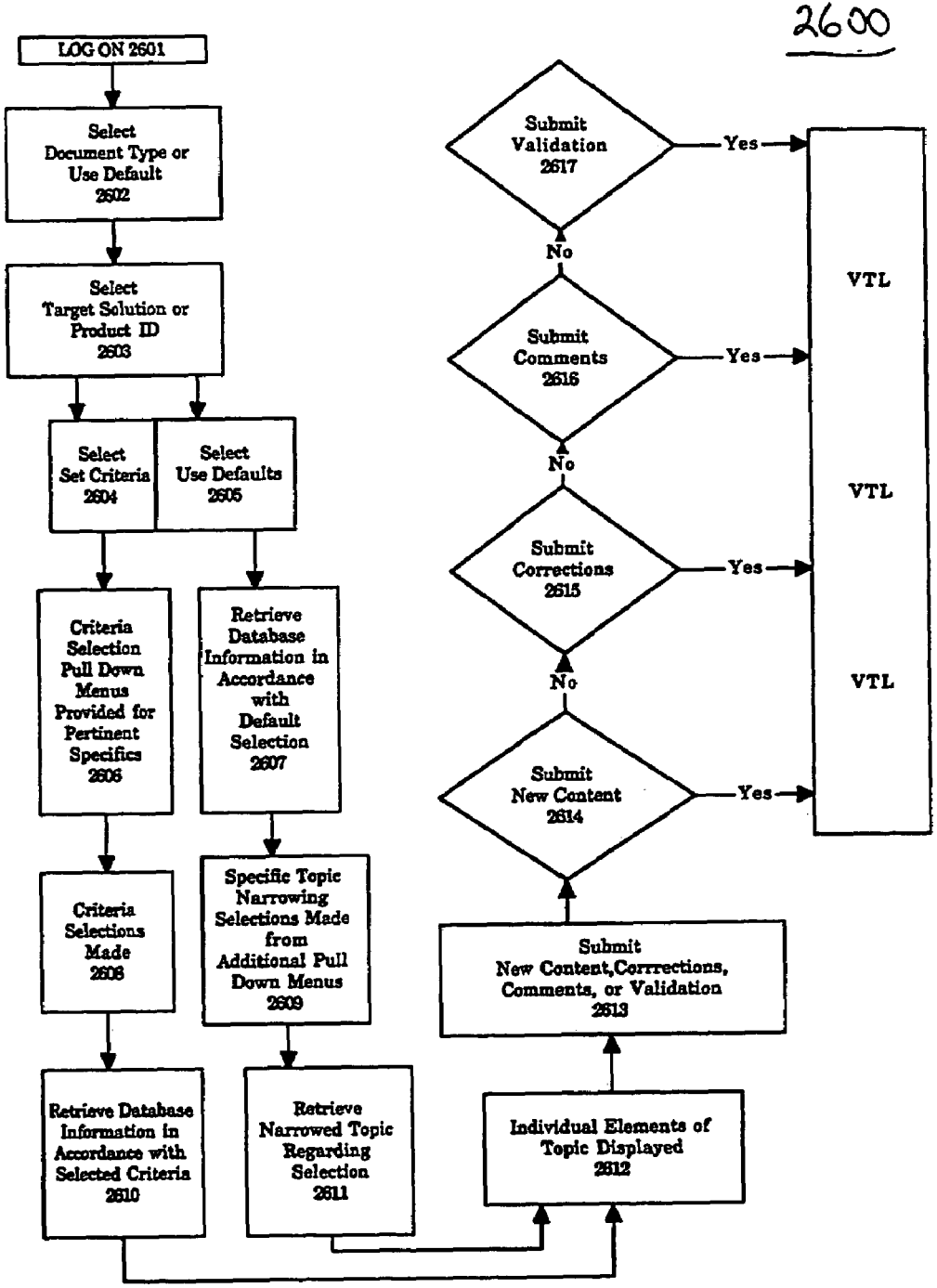
FIG. 26 is flowchart showing the steps in a method 2600 of content validation, in accordance with one embodiment of the present invention.

FIG. 26 is a flowchart showing the steps in a method 2600 for validating content, commenting on content, and submitting new content in an IDD (interactive dynamic documentation web site) 40, in one embodiment of the present invention.

In step 2601, the user logs on to IDD (interactive dynamic documentation web site) 40. Providing that the user is authorized to access IDD 40, presented to the user, via display, is index/home web page 200, as shown in FIGS. 5 and 6A, in one embodiment of the present invention.

In step 2602, the user would select, from the document type PDM (pull down menu) 203 of FIG. 6A, a document type, e.g., a solution troubleshooting guide, a solution design guide, a site survey, etc., from the listing of available document types or allows the default to go to none (no document type) if the user intends to access some information within IDD 40 without needing to build a document, in one embodiment of the present invention.

In step 2603, a user would select, from PDM (pull down menu) 204 of FIG. 6B, the target solution or product ID from a listing of available solutions or products, as shown in FIG. 6B and in FIG. 15, in one embodiment of the present invention.

Once the user has selected the target solution or product ID from PDM 204 of FIG. 6B or FIG. 15, the ThunderDial 2.1 solution in this example, and thusly depicted in FIG. 7, the user then needs to determine if further narrowing of the selection is required.

In step 2604, if further narrowing is needed, the user would then select the set criteria option, set criteria radio button 206 of FIG. 7, and then click on ready button 207 of FIG. 7, which submits to IDD 40 the selected document type and target solution/product. By selecting to set criteria, the user desires to further specify particular details, e.g., deployment phase or software release levels related to the selected solution or product, in one embodiment of the present invention.

In step 2604, if the user has chosen the set criteria option, and clicked on the ready button, the selected document type and target solution/product are submitted to and received by the IDD 40 which then triggers the display to the user of a web page, web page 600 of FIG. 8, in one embodiment of the present invention.

In step 2606, and continuing from step 2604, by providing additional pull down menus, as shown in web page 600 of FIG. 8, this enables a user to make further specific reductions regarding the amount of related information that is to be retrieved, and subsequently made viewable to that user. Furthermore, with less unrelated information being retrieved, less time is needed to retrieve the information.

In step 2608, and continuing from step 2606, once the user has made the appropriate selections from the pull down menus provided, as shown in FIGS. 9, 10, and 11, that newly chosen and redefined criteria is submitted to IDD 40 via submit criteria button 1110, shown in FIG. 11 as disposed below the pull down menus, in one embodiment of the present invention. Subsequent to the submission of the criteria, IDD 40 then retrieves the related information, related templates, and related screens, all of which are stored within the database. By interpreting the criteria set by the user, IDD 40 then builds the web page and subsequently displays that web page, web page 1200 of FIG. 12, in one embodiment of the present invention. In this example, the user has chosen the SC2200 (SC/VSC) signal controller topic from the pull down menus as described and shown in FIG. 11, in one embodiment of the present invention. Once the SC2200 selection has been made, a new web page, in this example, web page 1200 of FIG. 12, containing the subject matter pertaining to the SC2200 signal controller is displayed to the user, as shown in FIG. 12, in one embodiment of the present invention. Web page 1200 of FIG. 12 provides selectable text entry field 1210 within region 202 of FIG. 12, for further processing and activities based upon user selection and criteria previously specified, in one embodiment of the present invention.

In step 2610, and continuing from step 2608, the user would then continue to make selections from the newly provided selectable text entry field 1210 of FIG. 12. In this example, all available options for this subject matter is revealed to the user, through the use of a selectable text entry field with a scroll bar, field 1210 of FIG. 12. In the current example, the user has selected and submitted the checking alarms sub-topic and a new screen reflective of that choice is displayed, as shown in FIG. 13, in one embodiment of the present invention.

In step 2605, and continuing from step 2603, if further narrowing is not needed, the user would then select the use defaults option, use defaults radio button 205 of FIG. 15, and then click on ready button 207 of FIG. 15. By selecting to use defaults, the user desires to retrieve all the information related to the selected solution or product, in one embodiment of the present invention.

In step 2607, and continuing from step 2605, if the user has chosen to use defaults, and has clicked on ready button 207 of FIG. 15, thereby submitting those selections to IDD 40 which causes the user to be presented with a web page, web page 1600 of FIG. 16, in one embodiment of the present invention. Web page 1600 contains all the information related to the selected document type and/or selected target/product solution, in this example, ThunderDial 2.1.

In step 2609, and continuing from step 2607, the user can then make their selections from the newly presented PDMs (pull down menus) disposed within region 202 of web page 1600 of FIG. 16. The PDMs that are presented within region 202 are reflective of the previous selections, in this example, ThunderDial 2.1, as shown in FIG. 16, in one embodiment of the present invention. The PDMs are categorized based on earlier defined templates that have been stored in the database. In the present example, the information categories may consist of general topics, troubleshooting procedure/recommendations, alarm messages, reference material, sample configurations, command references. etc. The above list of categories should not be considered exhaustive, but used to illustrate the variety of categories available which may comprise one embodiment of the present invention.

In step 2611, after the user has chosen from among the available pull down menu selections, as shown in FIG. 17, in one embodiment of the present invention, the process continues. If the user chooses e.g., the log and alarm descriptions, IDD (interactive dynamic documentation web site) 40 will not retrieve a list of log messages until the user has requested it, but based upon previous selections with regard to product ID and criteria, IDD 40 knows which logs to retrieve if the user selects it. It should be appreciated that this function is analogous with regard to most selections within the IDD web site. The database retrieval will be based upon the given selection. In this example, the user has selected the HowDoI/FAQs topic, and has triggered a new web page, web page 2000 of FIG. 20.

In step 2612, and continuing from step 2610 and 2611, referenced are web page 1300 of FIG. 13 which is reflective of the steps leading to step 2610, and web page 2000 of FIG. 20 which is reflective of the steps leading to step 2611. At this point, whether the user selected set criteria or use defaults, the user has made a variety of selections from various categories and sub-topics, and the content has been retrieved from the database and displayed to the user. The resulting display presents the data as individual information elements. It should be appreciated that both web page 1300 of FIG. 13 and web page 2000 of FIG. 20 are similar with respect to the individual elements displayed within region 211 of either FIG. 13 or FIG. 20. Each separate element presented offers buttons for correcting, validating and/or commenting on content submissions by a user, in one embodiment of the present invention. The selection panel disposed on the left side of the screen further provides a button for triggering the submit content functionality contained within the IDD web site.

In step 2613, and continuing from step 2612, the user can then read the retrieved and displayed content and/or proceed with further actions by selecting the desired activity. The user can then, dependent upon their specific needs, submit new content, or submit content correction, or submit content validation, or submit a comment on the content, or simply read existing comments, in one embodiment of the present invention.

In step 2614, and continuing from step 2613, if the user has selected the submit content option, a screen containing various text entry boxes is presented to the user, as shown in web page 1800 of FIG. 18 is shown, in one embodiment of the present invention. The user may then enter their new content into the appropriate fields, and after completion, the user clicks on the submit button, as shown in FIG. 19, in one embodiment of the present invention. This content is then entered into the database where it becomes immediately accessible to others for them to read, correct, comment, or validate, as is shown in FIG. 20. As discussed with reference to the VTL of FIG. 14, new content, or yet to be reviewed content is indicated by the middle opening (yellow) of the VTL (validating traffic light) being illuminated.

In step 2615, and continuing from step 2613, if the user has selected the content correction button, and submitted that selection, in this example to correct the content as shown in FIG. 20, a web page containing the subject matter to which the corrections are to be applied and a text entry box are presented to the user, as shown in web page 2100 of FIG. 21, in one embodiment of the present invention. The user enters their correction(s) in the provided text entry box and then submits those corrections. In this example, the user has determined that the word MASTER, shown in FIG. 19 and in FIG. 20 at line 2050, is incorrect and is replaced with the correct wording, in this example, SLAVE. Once submitted, a screen acknowledging the receipt of that correcting submission is displayed, as shown in FIG. 21A, in one embodiment of the present invention. When the correction is submitted, as discussed with reference to the VTL of FIG. 14, when a correction has been submitted, the bottom opening (green) of the VTL is illuminated.

In step 2616, and continuing from step 2613, if the user has selected to comment on content, and submitted that selection, a comment panel which contains the subject matter and a text entry box for the user's comments is presented to the user, as shown in FIG. 23, in one embodiment of the present invention. This allows the user to submit a comment on a specific entry. As discussed with reference to the VTL of FIG. 14, once the comments have been submitted, as shown in FIG. 24, the VTL is reflective of those comments. If positive comments were submitted, the bottom opening (green) of the VTL would be illuminated. If, on the other hand, negative comments were submitted, the top opening (red) of the VTL would be illuminated.

In step 2617, and continuing from 2613, if the user has clicked on a validation button, to validate content, a validation panel which contains the related subject matter to be validated and the validation buttons are retrieved and displayed to the user, as shown in FIG. 25, in one embodiment of the present invention. In this example of the present invention, the options are negative validation and positive validation. It is this act of submitting validation (either negative or positive) by a user that automatically adjusts the VTL (validation traffic light), from yellow to either red (negative) or green (positive), based on the invoked algorithm contained within the IDD web site. Therefore, when another user accesses this content or subject matter, the VTL (validation traffic light) will now be reflective of the previous validation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An automated method for user review and validation of content comprising the steps of:
    displaying said content;
    assessing an indication of a state of a user's validation of said content from a set of indications that includes content not reviewed by user, use with caution; content reviewed by user with a positive validation; and content reviewed by user with a negative validation, and
    displaying said indication of a state of a user's validation of said content, said indication taken from said set.

2. The automated method as recited in claim 1 further comprising the step of:
    receiving user submitted comments to said content, said user submitted comments affecting said indicated state of validation of said content.

3. The automated method as recited in claim 1 further comprising the step of:
receiving user submitted corrections to said content, said user submitted corrections affecting said indicated state of validation of said content.

4. The automated method as recited in claim 1 further comprising the step of:
receiving user submitted validation of said content, said user submitted validation of content affecting said indicated state of validation of said content.

5. The automated method as recited in claim 1 further comprising the step of:
receiving user submitted validation of comment on said content, said user submitted validation of said comment on content affecting said indicated state of validation of said content.

6. The automated method as recited in claim 1 further comprising the step of:
receiving user submitted validation of correction to said content, said user
submitted validation of correction of content affecting said indicated state of validation of said content.

7. The automated method as recited in claim 1 wherein said indication of said state of the validation of the content comprises a traffic light icon comprising:
i) a green light indicative of said content being reviewed by a user and receiving a user submitted positive validation;
ii) a yellow light indicative of said content not yet reviewed, said content to be used with caution; and
iii) a red light indicative of said content being reviewed by a user and receiving a user submitted negative validation.

8. The automated method as recited in claim 1 wherein said content is displayed on a web page comprising fields and pull-down menus for enabling the selection of categories and sub-topics related to said content.

9. The automated method as recited in claim 1 wherein said content is new content submitted by a user, said new content subject to said validation.

10. The automated method as recited in claim 1 wherein said content is a received user submission of an addition to previously submitted content, said added content is subject to said validation.

11. The automated method as recited in claim 1 wherein said content is pertaining to technical information.

12. A computer system in a computer system network, said computer system comprising:
a bus;
a display device coupled to said bus;
a memory unit coupled to said bus; and
a processor coupled to said bus, said processor for executing a method for validating content comprising the steps of:
displaying said content;
accessing an indication of a state of a user's validation of said content from a set of indications that includes content not reviewed by user, use with caution; content reviewed by user with a positive validation; and content reviewed by user with a negative validation, and
displaying said indication of a state of a user's validation of said content, said indication taken from said set.

13. The computer system of claim 12 wherein said method for validating content further comprising the step of:
receiving user submitted comments to said content, said user submitted comments affecting said indicated state of validation of said content.

14. The computer system of claim 12 wherein said method for validating content further comprising the step of:
receiving user submitted corrections to said content, user submitted corrections affecting said indicated state of validation of said content.

15. The computer system of claim 12 wherein said method for validating content further comprises the step of:
receiving user submitted validation of said content, said user submitted validation of content affecting said indicated state of validation of said content.

16. The computer system of claim 12 wherein said method for validating content further comprises the step of:
receiving user submitted validation of comment on said content, said user submitted validation of said comment on content affecting said indicated state of validation of said content.

17. The computer system of claim 12 wherein said method for validating content further comprises the step of:
receiving user submitted validation of correction to said content, said user submitted validation of correction of content affecting said indicated state of validation of said content.

18. The computer system of claim 12 wherein said indication of said state of the validation of the content comprises a traffic light icon comprising:
i) a green light indicative of said content being reviewed by a user and receiving a user submitted positive validation;
ii) a yellow light indicative of said content not yet reviewed, said content to be used with caution; and
iii) a red light indicative of said content being reviewed by a user and receiving a user submitted negative validation.

19. The computer system of claim 12 wherein said content is displayed on a web page comprising fields and pull-down menus for enabling the selection of categories and sub-topics related to said content.

20. The computer system of claim 12 wherein said content is received new content submitted by a user, said new content subject to said validation.

21. The computer system of claim 12 wherein said content is a received user submission of an addition to previously submitted content, said added content is subject to said validation.

22. The computer system of claim 12 wherein said content is pertaining to technical information.

23. A computer readable medium for storing computer implemented instructions, said instructions for causing a computer system to perform content validation comprising the steps of:
displaying content;
accessing an indication of a state of a user's validation of said content from a set of indications that includes content not reviewed by user, use with caution; content reviewed by user with a positive validation; and content reviewed by user with a negative validation, and
displaying said indication of a state of a user's validation of said content, said indication taken from said set.

24. The computer readable medium of claim 23 wherein said computer implemented instructions cause a computer system to perform the step of:
receiving user submitted comments to said content, said user submitted comments affecting said indicated validation.

25. The computer readable medium of claim 23 wherein said computer implemented instructions cause a computer system to perform the step of:
  receiving user submitted correction to said content, said user submitted corrections affecting said indicated validation.

26. The computer readable medium of claim 23 wherein said computer implemented instructions cause a computer system to perform the step of:
  receiving user submitted validation of said content, said user submitted validation of content affecting said indicated state of said content.

27. The computer readable medium of claim 23 wherein said computer implemented instructions cause a computer system to perform the step of:
  receiving user submitted validation of comment on said content, said user submitted validation of said comment on said content affecting said indicated state of validation of said content.

28. The computer readable medium of claim 23 wherein said
  computer implemented instructions cause a computer system to perform the step of:
  receiving user submitted validation of correction to said content, said user submitted validation of correction to said content affecting said indicated state of validation of said content.

29. The computer readable medium of claim 23 wherein said indication of said state of content comprises a traffic light icon comprising:
  i) a green light indicative of said content being reviewed with a positive validation;
  ii) a yellow light indicative of said content not yet reviewed, said content to be used with caution; and
  iii) a red light indicative of said content being reviewed with a negative validation.

30. The computer readable medium of claim 23 wherein said computer implemented instructions cause a computer system to perform the step of:
  displaying said content on a web page comprising fields and pull-down menus for enabling the selection of categories and sub-topics related to said content.

31. The computer readable medium of claim 23 wherein said content is received new content submitted by a user, said new content subject to said validation.

32. The computer readable medium of claim 23 wherein said content is a received user submitted addition to previously submitted content, said user submitted addition to previously submitted content subject to said validation.

33. The computer readable medium of claim 23 wherein said content is pertaining to a technical guide.

34. A system for validating content, said system comprises:
  a means for displaying said content;
  a means for accessing an indication of a state of a user's validation of said content from a set of indications that includes content not reviewed by user, use with caution; content reviewed by user with a positive validation; and content reviewed by user with a negative validation, and
  a means for displaying said indication of a state of a user's validation of said content, said indication taken from said set.

35. The system of claim 34 further comprises the means for receiving user submitted comments to said content, said user submitted comments to content affecting said indicated state of validation of said content.

36. The system of claim 34 further comprises the means for receiving user submitted corrections to said content, said user submitted corrections to content affecting said indicated state of validation of said content.

37. The system of claim 34 further comprises the means for receiving user submitted validation of said content, said user submitted validation of content affecting said indicated state of validation of said content.

38. The system of claim 34 further comprises the means for receiving user submitted validation of comment on said content, said user submitted validation of said comment on content affecting said indicated state of validation of said content.

39. The system of claim 34 further comprises the means for receiving user submitted validation of correction to said content, said user submitted validation of correction of content affecting said indicated state of validation of said content.

40. The system of claim 34 wherein said indication of said state of content comprises an traffic light icon comprising:
  i) a green light indicative of said content being reviewed by a user and receiving a user submitted positive validation;
  ii) a yellow light indicative of said content not yet reviewed, said content to be used with caution; and
  iii) a red light indicative of said content being reviewed by a user and receiving a user submitted negative validation.

41. The system of claim 34 wherein said content is displayed on a web page comprising fields and pull-down menus adapted to provide a selection of categories and sub-topics related to said content.

42. The system of claim 34 wherein said content is received new content submitted by a user, said received new content subject to said validation.

43. The system of claim 34 wherein said content is an addition to content, said addition submitted by a user, said addition to content subject to said validation.

44. The system of claim 34 wherein said content is pertaining to a technical guide.

* * * * *